(12) United States Patent
Cox et al.

(10) Patent No.: US 8,683,451 B1
(45) Date of Patent: Mar. 25, 2014

(54) SYSTEM AND METHOD FOR TRANSLATING SOFTWARE CODE

(75) Inventors: Steven M. Cox, Crane, IN (US); Jonathan Torok, Bloomington, IN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 645 days.

(21) Appl. No.: 12/771,926

(22) Filed: Apr. 30, 2010

(51) Int. Cl.
*G06F 9/44* (2006.01)
*G06F 9/45* (2006.01)

(52) U.S. Cl.
USPC ............ 717/136; 717/124; 717/139; 717/141

(58) Field of Classification Search
None
See application file for complete search history.

(56) References Cited

U.S. PATENT DOCUMENTS

| | | | | |
|---|---|---|---|---|
| 4,374,408 A * | 2/1983 | Bowles et al. | | 717/137 |
| 5,349,660 A | 9/1994 | Sutula et al. | | |
| 5,754,860 A | 5/1998 | McKeeman et al. | | |
| 5,842,204 A * | 11/1998 | Andrews et al. | | 1/1 |
| 5,862,361 A | 1/1999 | Jain | | |
| 6,219,831 B1 * | 4/2001 | Ono | | 717/136 |
| 6,353,896 B1 | 3/2002 | Holzmann et al. | | |
| 6,389,385 B1 | 5/2002 | King | | |
| 6,523,171 B1 * | 2/2003 | Dupuy et al. | | 717/136 |
| 6,587,995 B1 | 7/2003 | Duboc et al. | | |
| 6,698,011 B1 * | 2/2004 | Reinders et al. | | 717/124 |
| 6,978,410 B1 * | 12/2005 | Parnas | | 714/724 |
| 7,139,949 B1 * | 11/2006 | Jennion et al. | | 714/726 |
| 7,363,621 B2 | 4/2008 | Takeuchi | | |
| 7,703,085 B2 * | 4/2010 | Poznanovic et al. | | 717/141 |
| 7,793,272 B2 * | 9/2010 | Andrews et al. | | 717/136 |
| 8,104,027 B2 * | 1/2012 | Owen et al. | | 717/139 |
| 8,255,882 B2 * | 8/2012 | Zhang et al. | | 717/136 |
| 2002/0038439 A1 * | 3/2002 | Sato | | 714/724 |
| 2002/0144240 A1 * | 10/2002 | Lueh et al. | | 717/136 |
| 2006/0277533 A1 | 12/2006 | Fiske | | |
| 2007/0006178 A1 * | 1/2007 | Tan | | 717/136 |
| 2007/0006184 A1 * | 1/2007 | Andrews et al. | | 717/136 |
| 2009/0235121 A1 * | 9/2009 | Mukherjee et al. | | 714/35 |
| 2009/0299677 A1 | 12/2009 | Torres | | |

OTHER PUBLICATIONS

Cristina Cifuentes et al., Binary Translation Static Dynamic Retargetable, 1996 IEEE, pp. 340-349, <http://ieeexplore.ieee.org/stamp/stamp.jsp?tp=&arnumber=565037>.*

Brian Alliet, Complete Translation of Unsafe Native Code to Safe Bytecode, 2004 ACM, pp. 32-41, <http://dl.acm.org/citation.cfm?id=1059589>.*

Gilles Muller et al., Harissa a Hybrid Approach to Java Execution, 1999 IEEE, pp. 44-51, <http://ieeexplore.ieee.org/stamp/stamp.jsp?tp=&arnumber=754052>.*

John Aycock, Converting Python Virtual Machine Code to C, 1998 python.org, 10 pages, <http://www.python.org/workshops/1998-11/proceedings/papers/aycock-211/aycock211.html>.*

(Continued)

*Primary Examiner* — Thuy Dao
*Assistant Examiner* — Cuong V Luu
(74) *Attorney, Agent, or Firm* — Christopher A. Monsey

(57) ABSTRACT

A system and method for generating test code software utilized by a test system for testing a circuit card assembly is provided. A translator provides an automatic translation of a test code from a first computer language to a second computer language. One or more pinmap documents are provided to map the pins of the circuit card assembly.

13 Claims, 21 Drawing Sheets

(56) References Cited

OTHER PUBLICATIONS

Anton Chernoff et al., A profile directed binary translator, 1998 IEEE, pp. 56-64, <ftp://ftp.cis.upenn.edu/pub/cis700-6/public_html/04f/papers/chernoff-fx32.pdf>.*

Kristy Andrews et al., Migrating a CISC Computer Family onto RISC via Object Code Translation, 1992 ACM, pp. 213-222, <http://dl.acm.org/citation.cfm?id=143520>.*

Luecke et al., "Software Code Base Conversions", Digital Avionics Systems Conference, IEEE/AIAA 26th Dec. 4, 2007, Dallas, TX, http://ieeexplore.ieee.org, (11 pgs.).

Peet, "Test Program Set (TPS) Migration: ROI for Functional Test Upgrade", Surface Mount Technology, Mar. 15, 2010, http://electroiq.com, (4 pgs.).

Stoye et al., "Using RTL-TO-C++ Translation for Large SOC Concurrent Engineering: A Case Study", Electronics Systems and Software, Apr. 29, 2003, pp. 20-25, vol. 1, Issue 1, http://ieeexplore.ieee.org, (6 pgs.).

De-Gui et al., "Transformation from Test Language ATLAS to C++", Computer and Information Technology, Dec. 27, 2005, http://ieeexplore.ieee.org, (4 pgs.).

"TPS Converter Studio™ Software", 2009, Teradyne, Inc., Assembly Test Division, North Reading, MA, http://www.teradyne.com/atd/resource/docs/tps/tps_converter_studio.pdf, (2 pgs).

Schmidt, "TPS Transportability: From the Factory to the Depot", IEEE Systems Readiness Technology Conference—Improving Systems Effectiveness in the Changing Environment of the '90's, Aug. 6, 2002, Anaheim, CA, http://ieeexplore.ieee.org, (5 pgs.).

Rolince, "Simplifying TPS Development and Execution Using a PC, Web-Based Environment", IEEE Systems Readiness Technology Conference, Aug. 6, 2002, Salt Lake City, UT, http://ieeexplore.ieee.org, (5 pgs.).

Zieg, "An Atlas to C Conversion Utility for VDATS", IEEE AUTOTESTCON 2008, Salt Lake City, UT, Oct. 31, 2008, http://ieeexplore.ieee.org, (3 pgs.).

Lennon, "Model-Based Design for Mechatronic Systems", Electronics World, May 2008, www.electronicsworld.co.uk, (4 pgs.).

* cited by examiner

```
;****************************************************
;
TEST 9;      CHECKS VARIOUS SIGNALS
CALL INIT         ;THIS TEST WILL CHECK THE WIRING OF
LO<125>           ;THE FOLLOWING NETS:
LO<87>            ;    U89-011
HI<10>            ;    U90-002
LO<154>           ;    U90-006
HI<149>           ;    U90-010
TOG 5<30>         ;    U91-011
XX<62,64,90,119>  ;
HI<115>           ;BY LOADING COUNTER U76 WITH 0100
TPV               ;AND 1000 AND CHECKING FOR DIFFERENT
CALL INIT         ;CONDITIONS AT OUTPUT I/O PIN IOB 48
LO<125>
LO<87>
HI<10>
LO<77>
LO<154>
LO<149>
TOG 5<30>
XX<62,64,90,119>
LO<115>
TPV
CALL INIT
LO<125>
LO<87>
HI<10,77>
LO<154>
HI<149>
TOG 4<30>
XX<62,64,90,119>
HI<115>
TPV
DISP "...TEST 9 COMPLETE";
DONE;

```
//****************************************************
// TEST ROUTINE 9:
//****************************************************
void Routine9(void)
{
        int i = 0;
        int j = 0;

fINIT();
        LO(1,P125);
        LO(1,P87);
        HI(1,P10);
        LO(1,P154);
        HI(1,P149);
        TOG(5,1,P30);
        XX(4,P62,P64,P90,P119);
        HI(1,P115);
        TPV(0);
        fINIT();
        LO(1,P125);
        LO(1,P87);
        HI(1,P10);
        LO(1,P77);
        LO(1,P154);
        LO(1,P149);
        TOG(5,1,P30);
        XX(4,P62,P64,P90,P119);
        LO(1,P115);
        TPV(0);
        fINIT();
        LO(1,P125);
        LO(1,P87);
        HI(2,P10,P77);
        LO(1,P154);
        HI(1,P149);
        TOG(4,1,P30);
        XX(4,P62,P64,P90,P119);
        HI(1,P115);
        TPV(0);
        printf("...TEST 9 COMPLETE\n");
}
```

FIG. 2B

```
// HI function...
void HI(ViInt32 size,...)
{
            ViStatus returnvalue;        // Returns the status of the terM9 function
            int i = 0;
            ViInt32 pin = 0;
            va_list args;
            va_start(args, size);
            for (i = 0; i < size; i++)
            {
                        pin = va_arg(args, ViInt32);
                        if (IOReg[pin] == 'i')
                                    returnvalue = terM9_setChannelPinOpcode(id, pin, MH);
                        else if (IOReg[pin] == 'o')
                                    returnvalue = terM9_setChannelPinOpcode(id, pin, OH);
                        else
                                    returnvalue = terM9_setChannelPinOpcode(id, pin, IOX);
                        CheckStatus(returnvalue);
            }
            va_end(args);
}

// LO function...
void LO(ViInt32 size,...)
{
            ViStatus returnvalue;        // Returns the status of the terM9 function
            int i = 0;
            ViInt32 pin = 0;
            va_list args;
            va_start(args, size);
            for (i = 0; i < size; i++)
            {
                        pin = va_arg(args, ViInt32);
                        if (IOReg[pin] == 'i')
                                    returnvalue = terM9_setChannelPinOpcode(id, pin, ML);
                        else if (IOReg[pin] == 'o')
                                    returnvalue = terM9_setChannelPinOpcode(id, pin, OL);
                        else
                                    returnvalue = terM9_setChannelPinOpcode(id, pin, IOX);
                        CheckStatus(returnvalue);
            }
            va_end(args);
}
```

┌─────────────────────────────────────────────────┐
  │                                                 │
  │  #ifndef PINMAP_H                               │
  │  #define PINMAP_H                               │
  │                                                 │
  │  // Default pin names and useages               │
  │  #define TRIGGER          TERM9_SCOPE_CHAN(0)   │
  │                                                 │
  │  // Row A                                       │
  │  //#define P1             TERM9_SCOPE_CHAN(1)   // A1: POWER
  │  //#define P2             TERM9_SCOPE_CHAN(2)   // A2: GND
  │  #define P3               TERM9_SCOPE_CHAN(3)   ←
  │  #define P4               TERM9_SCOPE_CHAN(4)        ─91
  │  #define P5               TERM9_SCOPE_CHAN(5)   │
  │  #define P6               TERM9_SCOPE_CHAN(6)   │
  │  #define P7               TERM9_SCOPE_CHAN(7)   │
  │  #define P8               TERM9_SCOPE_CHAN(8)   │
  │  #define P9               TERM9_SCOPE_CHAN(9)   │
  └─────────────────────────────────────────────────┘
```

| Channels of Test System 30 | Pin Names Displayed on User Interface 32 | Bus names |
|---|---|---|
| Channel_0 | TRIGGER (oscilloscope) | |
| Channel_3 | A3_P3 | IDB003 |
| Channel_4 | A4_P4 | IDB004 |
| Channel_5 | A5_P5 | IDB006 |
| Channel_6 | A6_P6 | |
| Channel_7 | A7_P7 | |
| Channel_67 | C63_P197 | |
| Channel_68 | C64_P198 | XFRMSN2 |
| Channel_69 | C65_P199 | XFRMSN0 |

FIG. 4B

Open Bracket

SYSTEM AND METHOD FOR TRANSLATING SOFTWARE CODE

STATEMENT REGARDING FEDERALLY SPONSORED RESEARCH OR DEVELOPMENT

The invention described herein was made in the performance of official duties by employees of the Department of the Navy and may be manufactured, used, licensed by or for the United States Government for any governmental purpose without payment of any royalties thereon.

BACKGROUND AND SUMMARY

The present disclosure relates generally to a system and method for translating software code from one language to another language. More particularly, the present disclosure relates to a system and method for generating test code software utilized by a test machine for testing a circuit card assembly.

In commercial and military industries, test systems are often used to test various electrical equipment and electronics, such as circuit boards, hard drives, electrical components, semiconductors, integrated circuits, and other electrical hardware and devices. These test systems, also referred to as automated test equipment, automatically perform tests on a device based on instructions from test program software. When a legacy test system is replaced by a new test system, the test program run by the legacy test system must be converted to a language and format that is compatible with the new test system.

According to one illustrated embodiment of the present disclosure, a software translation method comprises receiving a first software code containing a first function command and data associated with the first function command, the first function command being configured to produce a first result, and associating at least one second function command in a second software code with the first function command. The method further comprises generating a third software code based on the first software code, the generating step including creating a hybrid function command based on the first function command, the hybrid function command including an interface to the at least one second function command of the second software code, and creating a case statement configured to associate the first function command of the first software code with the hybrid function command and to provide the data associated with the first function command to the hybrid function command, the hybrid function command being configured to produce the same first result as the first function command upon execution of the hybrid function command using the data associated with the first function command of the first software code provided by the case statement.

In one illustrated embodiment, the first software code is a test code utilized by a first test system for performing an operational test on a circuit card assembly and the second and third software codes are test codes utilized by a second test system for performing the operational test on the circuit card assembly. In one illustrated embodiment, the first result produced by the first function command and the hybrid function command includes at least one test operation of the operational test on the circuit card assembly.

In one illustrated embodiment, the second software code is an instrument code file configured to interact with testing instruments of the second test system to execute the at least one test operation on the circuit card assembly. In one illustrated embodiment, the associating step includes identifying at least one second function command in the second software code that is configured to cause the testing instruments of the second test system to perform at least a portion of the at least one test operation on the circuit card assembly. In another illustrated embodiment, the data associated with the first function includes the identification of at least one pin of the circuit card assembly, the at least one test operation being performed on the at least one pin of the circuit card assembly.

According to another illustrated embodiment of the present disclosure, a method of generating test code software utilized by a processor of a test machine for testing a circuit card is provided, the circuit card including a plurality of pins configured to connect to corresponding channels of the test machine. The method comprises receiving at least one input parameter, the at least one input parameter including a pin configuration of a circuit card, receiving a first test code referencing the pins of the circuit card in a first identification format, translating the first test code to generate a second test code, the second test code referencing the pins of the circuit card in a natural identification format not recognizable by the processor of the test machine, and associating each pin reference in the natural identification format with a pin reference in a second identification format based on the pin configuration of the circuit card, the second identification format being readable by the processor of the test machine.

In one illustrated embodiment, the associating step includes creating a first pinmap mapping each pin reference in the natural identification format to a corresponding pin reference in the second identification format. In one illustrated embodiment, the first pinmap maps the locations of an input pin, an output pin, and a power pin of the circuit card to the corresponding pin references in the second identification format. In another illustrated embodiment, each corresponding pin reference in the second identification format identifies a channel of the test machine connected to the pin of the circuit card identified by the corresponding pin reference in the natural identification format.

In one illustrated embodiment, the method further comprises generating a second pinmap based on the pin configuration of the circuit card and the channel configuration of the test machine, the second pinmap associating at least one channel of the test machine with a pin reference in a third identification format. In another illustrated embodiment, the test machine includes a graphical display configured to display the pin references in the third identification format based on the second pinmap.

According to yet another illustrated embodiment of the present disclosure, a software translation system comprises a first software code containing a first function command and data associated with the first function command, the first function command being configured to produce a first result, a second software code containing at least one second function command, and a translator configured to receive the first software code and to generate a third software code based on the first software code. The third software code includes a hybrid function command including an interface to the at least one second function command of the second software code. The third software code further includes a case statement associating the first function command of the first software code with the hybrid function command and being configured to provide the data associated with the first function command to the hybrid function command. The hybrid function command is configured to produce the same first result as the first function command upon execution of the hybrid function command using the data associated with the first function command of the first software code provided by the case statement.

According to yet another illustrated embodiment of the present disclosure, a test code generation system configured to generate test code software utilized by a processor of a test machine for testing a circuit card is provided, the circuit card including a plurality of pins configured to connect to corresponding channels of the test machine. The system comprises at least one input parameter identifying a pin configuration of a circuit card, a first test code referencing the pins of the circuit card in a first identification format, and a translator configured to receive the first test code and the at least one input parameter and to generate a second test code based on the first test code. The second test code references the pins of the circuit card in a natural identification format not recognizable by the processor of the test machine. The system further comprises a first pinmap mapping each pin reference in the natural identification format with a pin reference in a second identification format based on the pin configuration of the circuit card, the second identification format being readable by the processor of the test machine.

Additional features and advantages of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 2A illustrates an exemplary portion of the first test code of FIG. 2;

FIGS. 2B and 2C illustrate exemplary portions of the second test code of FIG. 2;

FIG. 4A illustrates an exemplary portion of a first pinmap document of FIG. 4;

FIG. 4B illustrates an exemplary portion of a second pinmap document of FIG. 4;

Figure 1:
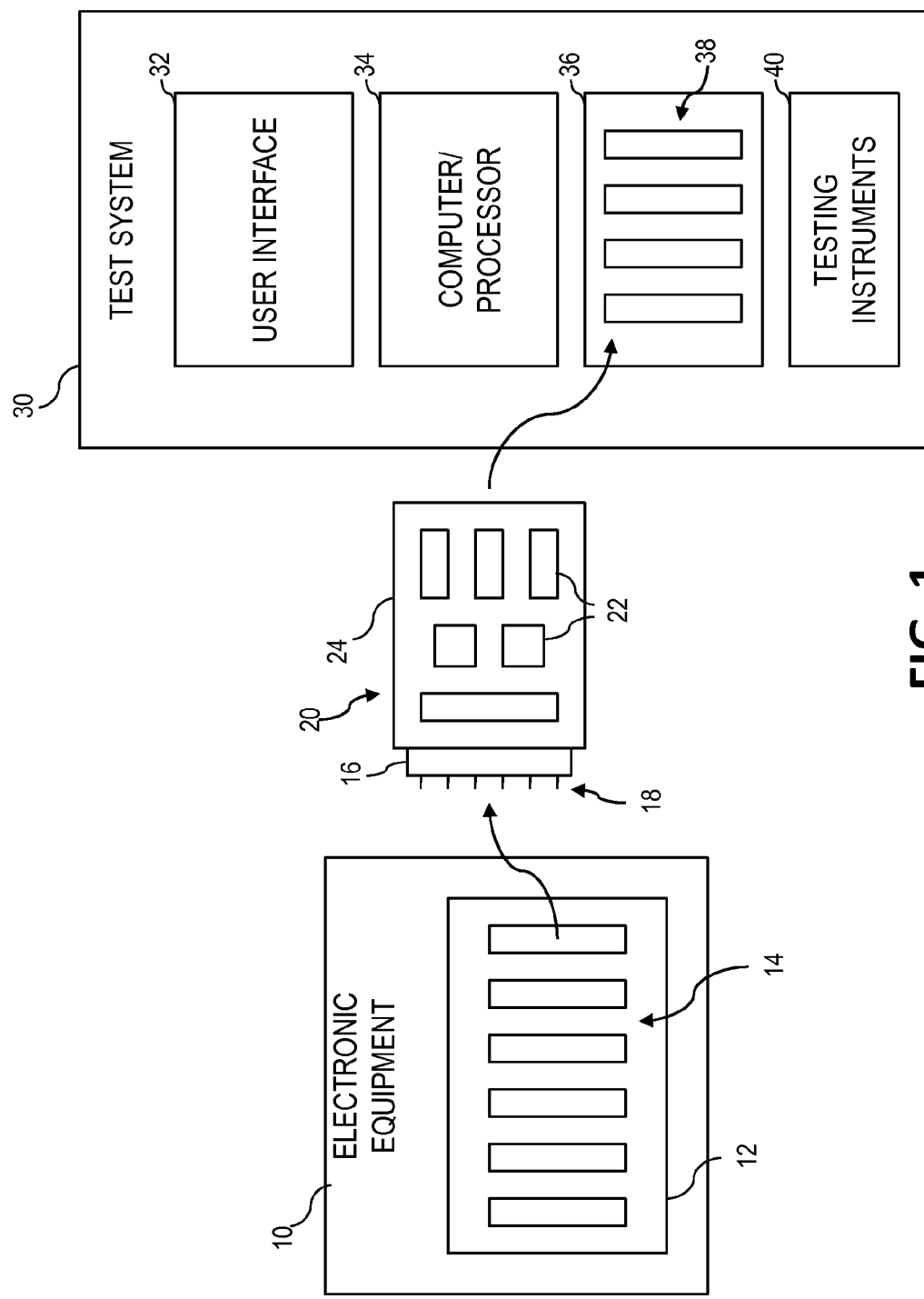
FIG. 1 illustrates an exemplary circuit card assembly configured to be tested by a test system.

Corresponding reference characters indicate corresponding parts throughout the several views. Although the drawings represent embodiments of various features and components in the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring initially to FIG. 1, an exemplary circuit card assembly 20 of the present disclosure is shown. Circuit card assembly 20 is configured to connect to electronic equipment 10 and to perform various functions for electronic equipment 10. Electronic equipment 10 illustratively includes a backplane connector 12 having one or more slots 14, and each slot 14 is configured to receive a circuit card assembly 20. Circuit card assembly 20 and electronic equipment 10 may be used in a variety of applications, including manufacturing, military, or aerospace applications. In one embodiment, electronic equipment 10 is a radar system that utilizes a plurality of circuit card assemblies 20, each circuit card assembly 20 being configured to perform one or more specific functions for the radar system. For example, circuit card assembly 20 may read the memory of a computer on electronic equipment 10, perform mathematical functions, monitor faults, perform memory control functions, analyze data, and send control and configuration signals to other equipment.

Circuit card assembly 20 includes a plurality of electrical components 22 mounted to a circuit board 24. Components 22 include integrated circuits (IC's), passive elements, and/or active elements. In the illustrated embodiment, circuit card assembly 20 is a digital card used in a digital radar system, although circuit card assembly 20 may alternatively be an analog card.

Circuit card assembly 20 includes one or more connectors 16 having a plurality of electrical pins 18. Pins 18 illustratively include input pins, output pins, power pins, and a clock pin. Connector 16 may be any conventional male or female connector configured to interconnect the circuitry mounted to circuit card assembly 20 to a plug-in circuit card assembly apparatus, such as backplane connector 12 of electronic equipment 10. Circuit board 24 of circuit card assembly 20 further includes conductive paths (not shown) interconnecting components 22 to each other and to pins 18 of connector 16. The conductive paths may be etched into a non-conductive substrate to facilitate communication between components 22. The conductive paths may also be wire-wrapped. Circuit card assembly 20 may include any number of circuit boards 24, and each circuit board 24 may include any suitable number of layers to support the conductive paths.

A test system 30 illustratively includes a computer 34 and a user interface 32. In the illustrated embodiment, test system 30 is a digital test system configured to perform operational tests on digital circuit cards 20 by running a series of test patterns on the circuitry of the circuit cards 20. Test system 30 may also be configured to perform analog, mixed-signal, or serial bus testing on circuit cards 20. Each test pattern may include several test operations. Test system 30 illustratively includes testing instruments 40 configured to execute each test operation on the circuit card assembly 20. For example, testing instruments 40 may include signal generators, output detectors, and other instruments suitable for testing a circuit. Test system 30 is configured to test the functionality of circuit card assembly 20 and to determine the existence of any faults, errors, and other failures of circuit card assembly 20. For example, test system 30 may be used to test a circuit card assembly 20 that has failed in the field or that has been newly manufactured prior to entering the field.

Figure 2:
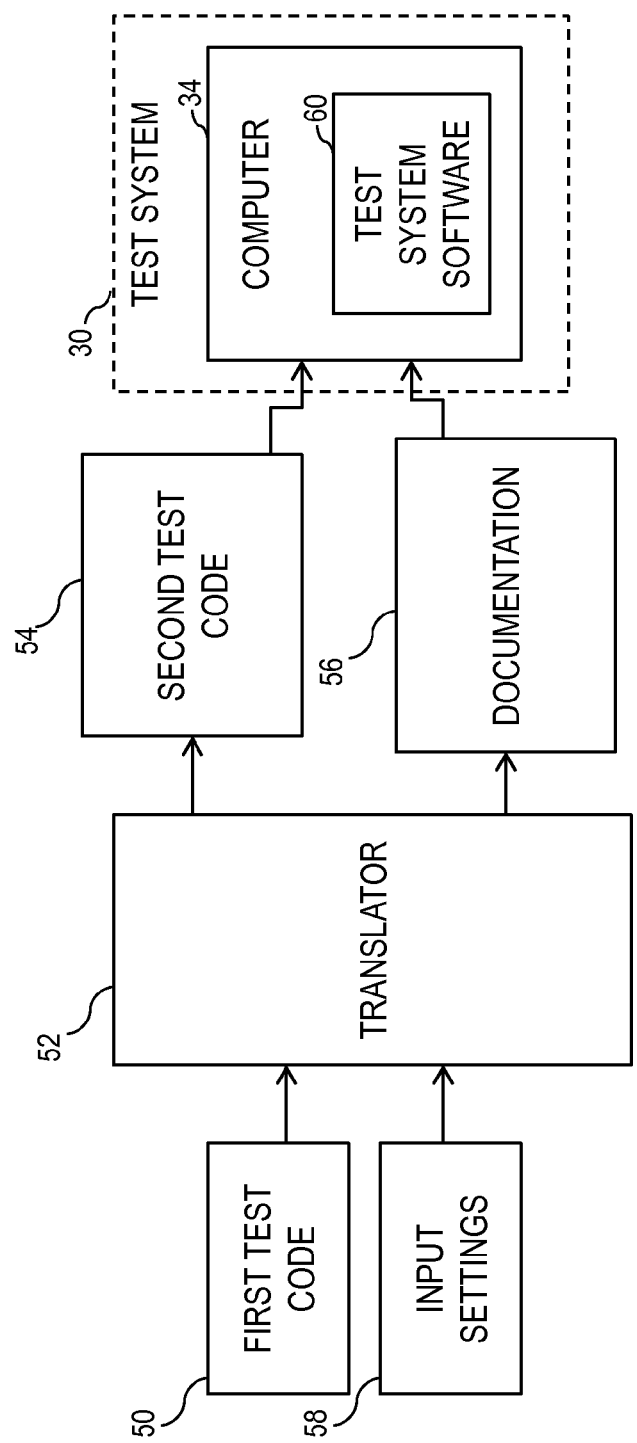
FIG. 2 is a block diagram illustrating a software translator receiving a first test code and outputting a second test code.

Computer 34 of test system 30 includes a processor that executes software code, illustratively test system software 60 of FIG. 2, stored in a memory to perform an operational test on circuit card assembly 20, as described herein. User interface 32 allows an operator to provide input settings to initiate the test program. User interface 32 may include a graphical display to allow an operator to monitor the status and results of the circuit card tests. A backplane connector 36 on test system 30 includes one or more adaptors 38 for receiving a circuit card assembly 20. Each adaptor 38 includes a connector (not shown) configured to receive a plug-in connector 16 of a circuit card assembly 20. Each adaptor 38 routes pins 18 of circuit card assembly 20 to the appropriate pins of test system 30. In one embodiment, test system 30 is a modular system configured to receive various components for individualized applications. For example, test system 30 may further include one or more power supplies and an oscilloscope. An exemplary test system 30 is the Spectrum 9100 Series Model available from Teradyne, Inc.

Each circuit card assembly 20 has a corresponding software test code that is loaded into test system 30 and executed by test system 30 in conjunction with software 60 to perform an operational test on each circuit card assembly 20. When a legacy test system is replaced by a new test system, illustratively test system 30, the software code used by the legacy test system to perform tests on each circuit card assembly 20 is often not compatible with the processor of the new test system. In many instances, the software code utilized by the legacy test system is written in a computer language that is not readable by the new test system. In such a case, the software code must be translated into a computer language readable by the new test system prior to executing the software code and performing a test on the new test system.

As illustrated in FIG. 2, a translator 52 provides an automatic translation of a first test code 50 to a second test code 54. In the illustrated embodiment, first test code 50 is utilized by a legacy test system, and second test code 54 is utilized by a new test system, illustratively test system 30. An exemplary portion of first test code 50 is illustrated in FIG. 2A, and exemplary portions of second test code 54 are illustrated in FIGS. 2B and 2C. In the illustrated embodiment, first test code 50 is written in Raytheon Test Language (RTL) and second test code 54 is written in C Programming Language. However, the first and second languages may be other suitable programming languages. In the illustrated embodiment, translator 52 is an executable computer program stored on a computer separate from test system 30. Alternatively, translator 52 may be stored on computer 34 of test system 30 to allow a user to translate first test code 50 and to compile and execute second test code 54 on a single computer 34.

Translator 52 illustratively receives input settings 58 prior to performing the software code translation, as illustrated in FIG. 2. Input settings 58 provide translator 52 with necessary information regarding the translation to be performed. In the illustrated embodiment, input settings 58 include information regarding the pin configuration of circuit card assembly 20, as described herein with reference to FIGS. 5 and 6.

Second test code 54 may include one or more program or code files. In the illustrated embodiment, test code 54 includes a project file, a workspace file, one or more header files, and one or more main files, as described herein with reference to FIG. 5. In one embodiment, test code 54 also includes one or more template files, such as template files 153 and 155 of FIG. 5. Template files 153 and 155 are software code templates configured to receive program code manually input by a user or automatically input by another program or system following the translation by translator 52. For example, when first test code 50 includes additional program files written in a language not recognized by translator 52, one or more template files may be created and used as templates for a subsequent translation of the unrecognized program files. In one embodiment, template files 153 and 155 are called by other program files of second test code 54 during the execution of the test patterns on test system 30. In the illustrated embodiment, translator 52 also generates documentation 56 utilized by test system 30. Documentation 56 may include one or more pinmap documents utilized by test system 30, such as first pinmap document 114 and second pinmap document 116 of FIGS. 4, 4A, 4B, and 5. Documentation 56 may also include a "readme file" containing information regarding second test code 54 and the translation process, such as readme file 159 of FIG. 5.

Each operational test performed by test system 30 detects faults, if any, in the circuitry of circuit card assembly 20 by running a series of test patterns on circuit card assembly 20. Each test pattern may include several test operations, such as setting an input pin "high" and detecting the output of a corresponding output pin, for example. In some instances, thousands of test patterns are run during a single test of circuit card assembly 20. The test patterns provide an input signal to one or more input pins of circuit card assembly 20 and verify that a proper responsive output signal is detected at one or more output pins of circuit card assembly 20. Test system 30 may isolate a fault on circuit card assembly 20 by monitoring the output signals from the output pins over several executed test patterns. The test patterns are illustratively contained in second test code 54 and test system software 60 and run by computer 34 of test system 30. In one embodiment, second test code 54 includes several test routines, such as test routine 63 of FIG. 2B for example, and each test routine contains several test patterns.

In the illustrated embodiment, upon loading test code 54 into computer 34, test code 54 interfaces with an instrument driver, i.e., an instrument code file, contained in test system software 60 to execute the test patterns on circuit card assembly 20. In particular, a set of functions contained in an instrument file of software 60 and configured to control the testing instruments 40 of test system 30 are called by test code 54.

The functions contained in software 60 allow test code 54 to interact with the testing instruments 40 or hardware of test system 30 that are used to physically run test patterns on circuit card assembly 20. For example, the functions of software 60 are used to set a pin of circuit card assembly 20 during the execution of a designated test pattern, to create conditions on each test pattern such as repeat, test, loop, halt, etc., to add new test patterns to the operational test of circuit card assembly 20, to fetch the state of an output pin of circuit card assembly 20 (e.g. high, low, or neither), to create a test routine, and to run a test routine. Such a programming structure allows test code 54 to use the pre-defined instrument driver functions stored in an instrument file at test system 30 rather than creating new instrument driver functions in test code 54.

Figure 3:
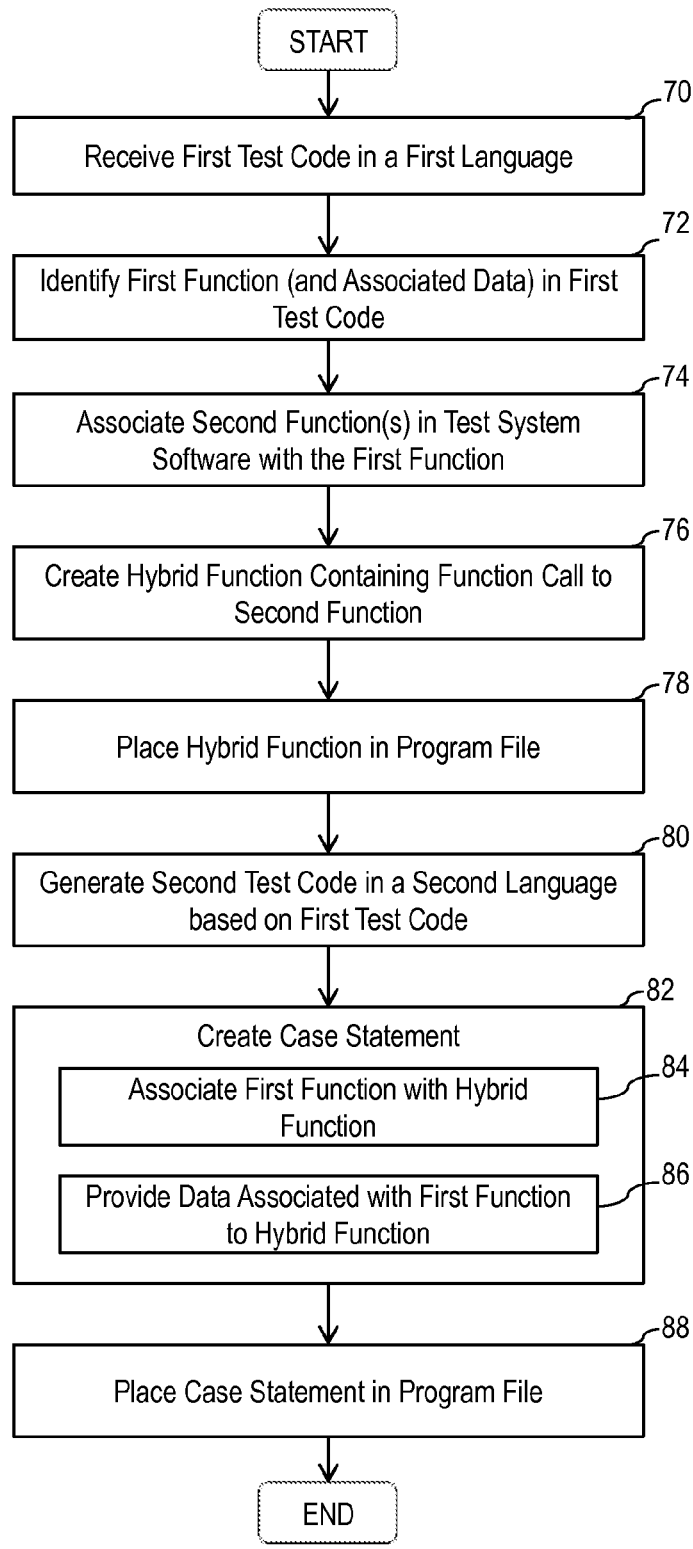
FIG. 3 is a flowchart illustrating an exemplary method of translating a software code from a first language to a second language.

Referring to FIG. 3, an exemplary method of translating a software code from a first language to a second language using translator 52 is provided. While the following describes FIG. 3 with reference to first test code 50, second test code 54, and test system software 60 of FIG. 2, the method illustrated in FIG. 3 may be used to translate software code not utilized by a test system. In block 70, translator 52 receives first test code 50 written in a first language, such as RTL for example. First test code 50 is loaded into translator 52 from a data storage medium or from a computer memory. A first function in first test code 50 and the data associated with the first function are identified, as represented by block 72. In the illustrated embodiment, the first functions in first test code 50 are configured to execute a test operation or a test pattern. An exemplary first function is "LO" function 57 of first test code 50 illustrated in FIG. 2A. Other exemplary first functions include the "HI", "TOG", and "XX" functions of first test code 50. The data or argument value associated with each first function is also identified at block 72. For example, the value 125 associated with the "LO" function 57 in FIG. 2A is identified at block 72.

At block 74 of FIG. 3, one or more second functions contained in test system software 60 of FIG. 2 are identified and associated with each first function of test code 50. In particular, the intended test operation of the first function identified at block 72 is examined. One or more second functions of software 60 are selected that are configured to apply the intended test operation of the first function to the operational test of circuit card assembly 20 using test system 30. In the illustrated embodiment, the second functions of test system software 60 comprise the instrument file containing software code configured to control the testing instruments and hardware of test system 30. For example, if a first function of test code 50 sets a pin of circuit card assembly 20 to a "high" state, a second function of software 60 that is configured to cause test system 30 to set a pin of circuit card assembly 20 to the "high" state is selected at block 74. In one embodiment, a second function of test system software 60 is selected at block 74 that is configured to cause the testing instruments of test system 30 to perform only a portion of the intended test operation of the first function of test code 50 on circuit card assembly 20.

At block 76, a hybrid function is created based on the first function of test code 50 identified at block 72. See, for example, exemplary hybrid functions 62 and 64 of FIG. 2C. The hybrid function is written in a second language readable by computer 34 of test system 30 (e.g. C language) and is configured to perform the same task or to produce the same result as the first function of test code 50. For example, if the first function of test code 50 provides a test pattern to the operational test of circuit card assembly 20, a hybrid function is created at block 76 that is configured to provide that same test pattern. The hybrid function created in block 76 also includes an interface to the one or more second functions of software 60 identified in block 74. In the illustrated embodiment, the hybrid function contains a function call to the one or more second functions of software 60 identified in block 74. See, for example, function call 65 in hybrid function 62 of FIG. 2C that interfaces second function "terM9_setChannelPinOpcode" of software 60 with hybrid function 62. The complete testing operation or test pattern as defined by the first function of test code 50 is performed at test system 30 using the hybrid function. As represented by block 78, the hybrid function is stored in a program file. In the illustrated embodiment, a plurality of hybrid functions, each corresponding to a first function of first test code 50 and calling one or more appropriate second functions of software 60 (as determined at block 74), are stored in a single program file, such as functions file 147 of FIG. 5. In one embodiment, functions file 147 is received by translator 52 and is included in second test code 54 generated by translator 52.

In one embodiment, the steps in blocks 72, 74, 76, and 78 are performed by a programmer manually before proceeding with the automatic translation process using translator 52 at block 80. For example, the hybrid function may be written manually by a programmer upon analysis of the intended result of the first function of first test code 50, the operation of the second function of test system software 60, and the additional code in the hybrid function needed to achieve the intended result of the first function upon execution of the hybrid function at test system 30. Alternatively, the hybrid function may be created automatically using an algorithm stored in translator 52.

As represented by block 80, second test code 54 is generated in a second language (e.g. C language) based on a translation of first test code 50. The translation of first test code 50 to second test code 54 at block 80 is described herein with reference to FIGS. 5-16. The generation of second test code 54 includes the creation of a case statement corresponding to the first function of first test code 50 identified in block 72, as represented by block 82. The case statement associates the first function of test code 50 with the hybrid function of test code 54, as represented by block 84. The case statement also provides the data associated with the first function of test code 50 to the corresponding hybrid function of test code 54, as represented by block 86. As such, the case statement provides a function call to the hybrid function, and the hybrid function is executed using the data provided by the case statement. For example, a case statement 61 of the exemplary portion of test code 54 in FIG. 2B associates the "LO" function 57 of exemplary test code 50 of FIG. 2A with the hybrid function 64 of FIG. 2C. Further, case statement 61 provides the data "125" associated with the "LO" function 57 to hybrid function 64. At block 88, the case statement is stored in a program file of test code 54, such as patterns file 145 of FIG. 5. In the illustrated embodiment, a plurality of case statements each corresponding to a first function of test code 50 are created and stored in a program file of test code 54.

Figure 4:
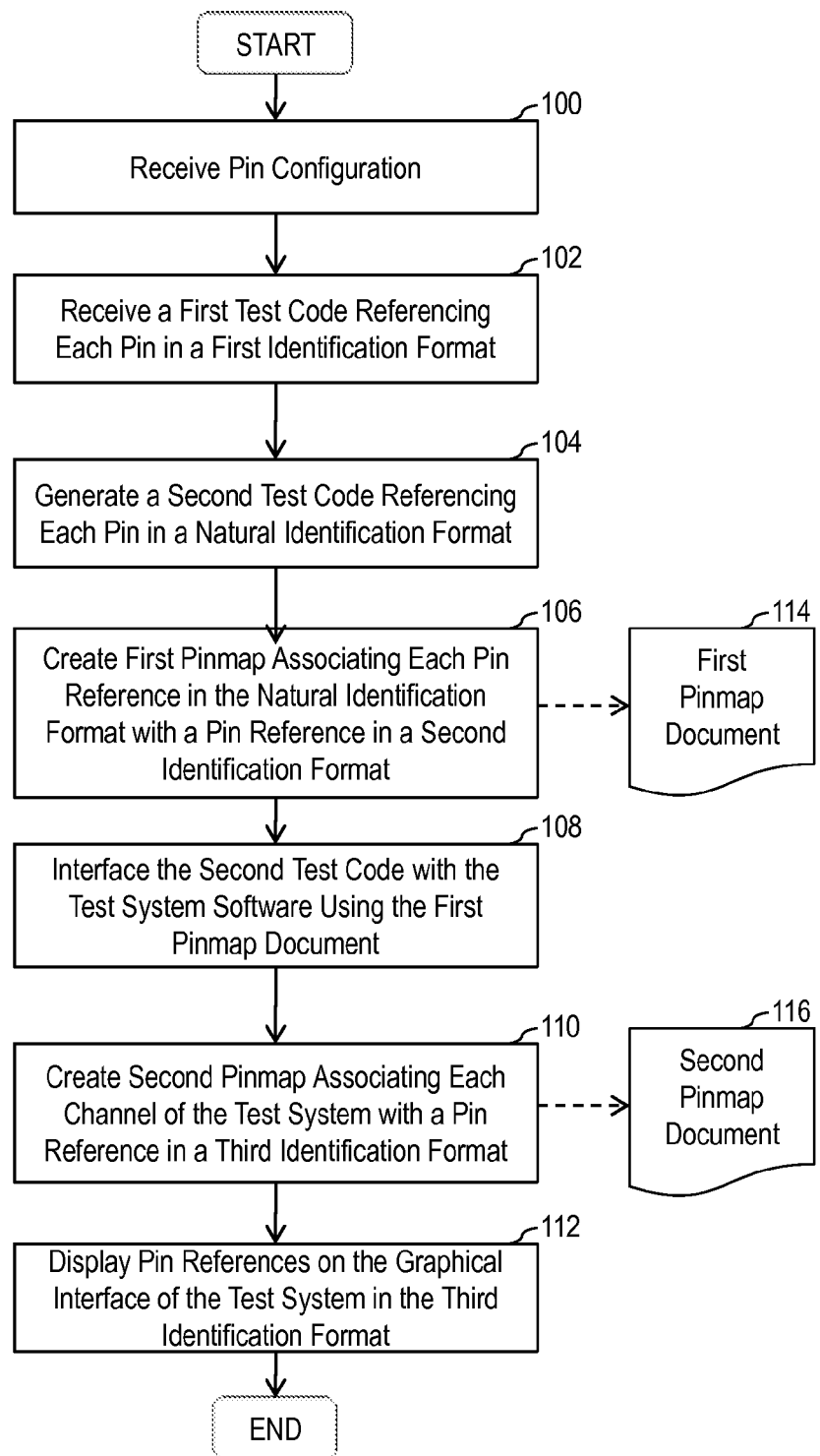
FIG. 4 is a flowchart illustrating an exemplary method of mapping the pins of the circuit card assembly of FIG. 1.

Referring to FIG. 4, an exemplary method of mapping pins of circuit card assembly 20 is illustrated. In the illustrated embodiment, first test code 50, second test code 54, and test system software 60 all reference the pins of circuit card assembly 20 using a different identification format or nomenclature. In one embodiment, at least one of first test code 50, second test code 54, and test system software 60 references the pins of circuit card assembly 20 using a different computer language. In the illustrated embodiment, one or more pinmap documents are created to cross-reference the pin references in each software code.

In the illustrated embodiment, software 60 references a pin of circuit card assembly 20 by identifying the corresponding channel or pin of adaptor 38 that is in communication with that pin of circuit card assembly 20. The channels of adapter 38 of test system 30 do not always correspond to the pin numbers of circuit card assembly 20 on a one-to-one basis. For example, pin five on circuit card assembly 20 may match up with pin twenty-five on adaptor 38 of test system 30 when circuit card assembly 20 is inserted into an adaptor 38 of test system 30. As such, a pinmap document is created to map each pin of circuit card assembly 20 to a corresponding channel of adaptor 38. See, for example, second pinmap document 116 illustrated in FIG. 4 and described herein. The pinmap document is utilized by test system 30 to accurately display the status of each pin on circuit card assembly 20 to user interface 32. For example, test system 30 uses a pinmap document to report the status of pin five of circuit card assembly 20 to user interface 32 rather than erroneously reporting the status of the pin on circuit card assembly 20 that is in communication with the fifth pin or channel of adaptor 38.

Figure 6:
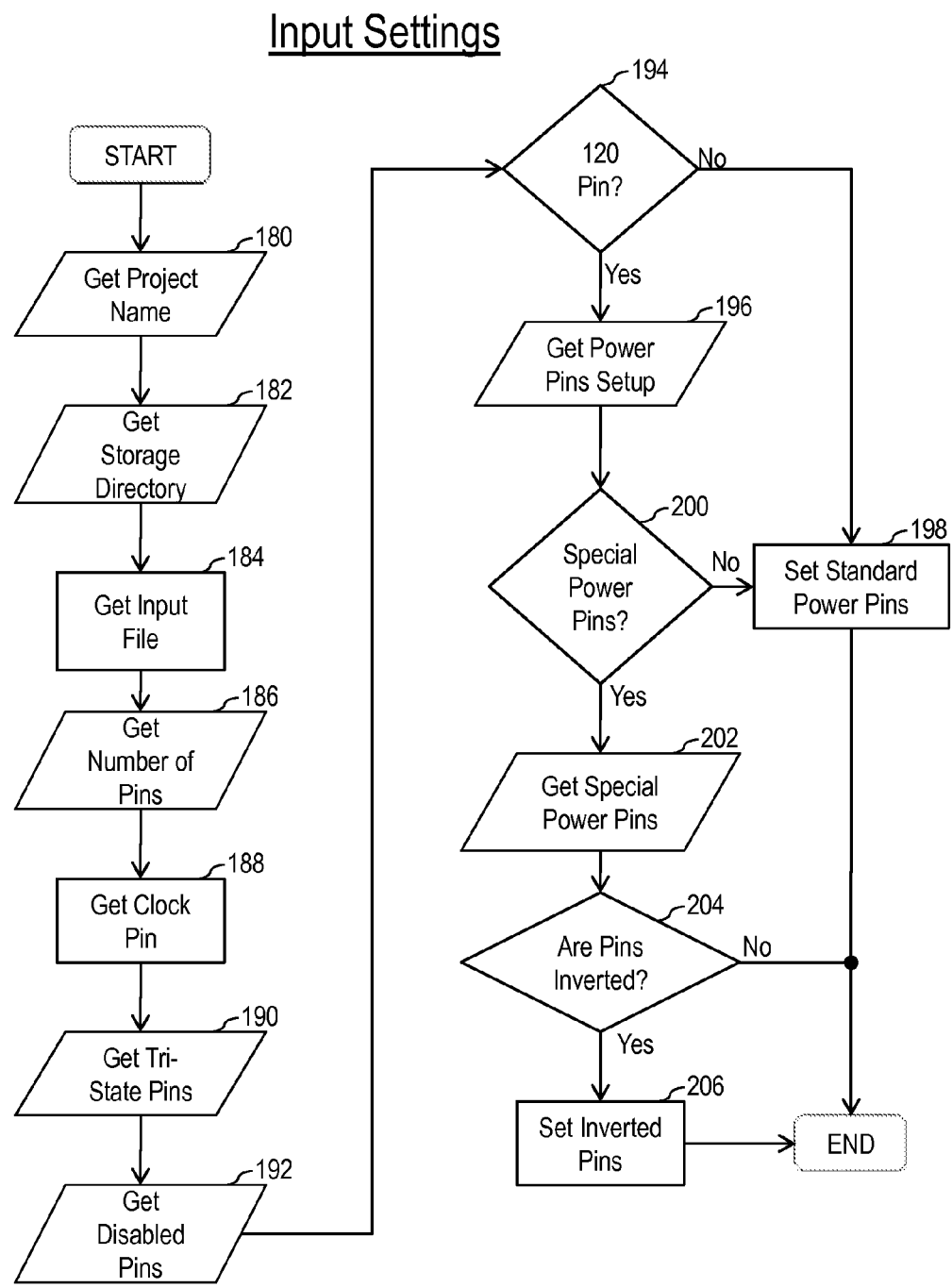
FIG. 6 is a flowchart illustrating an exemplary method for receiving input settings in the test code generation process of FIG. 5.

Referring to block 100 of FIG. 4, translator 52 receives the pin configuration of the circuit card assembly 20 to be tested by test system 30. The pin configuration identifies the number of pins on circuit card assembly 20 and may provide additional pin information such as the locations of the input pins, the output pins, the power pins, the clock pin, and the tri-state pins. In the illustrated embodiment, the pin configuration is included in input settings 58 illustrated in FIG. 2. An exemplary method of receiving the pin configuration is illustrated in FIG. 6 and described herein.

At block 102, first test code 50 is received by translator 52. First test code 50 contains references to the pins of circuit card assembly 20 in a first identification format. In the illustrated embodiment, the pins of circuit card assembly 20 are referenced in first test code 50 using numerical values. Referring to FIG. 2A, for example, the number "125" in function 57 of test code 50 is used to reference a specific pin on circuit card assembly 20. As such, the location of each pin on circuit card assembly 20 is identified in first test code 50 using a corresponding number value. Alternatively, the pin references of first test code 50 may include other suitable letters, numbers, or characters that are consistent with and recognizable by the programming language of first test code 50.

At block 104, translator 52 generates second test code 54 that contains references to the pins of circuit card assembly 20 written in a natural language identification format. The generation of second test code 54 by translator 52 is illustrated in FIGS. 5-16 and described herein. In the illustrated embodiment, the natural language pin references in second test code 54 are configured to be readable and recognizable by a user but unreadable by computer 34 of test system 30. See, for example, the pin reference "P125" of case statement 61 of second test code 54 illustrated in FIG. 2B. In the illustrated embodiment, test system software 60 is unable to recognize "P125" as a pin name, but a user reviewing second test code 54 may immediately associate "P125" with pin 125 of circuit card assembly 20.

Software 60 contains pin references written in a second identification format or nomenclature. At block 106, a first pinmap document 114 is generated that associates each pin reference of second test code 54 written in the natural identification format with a pin reference of test system software 60 written in the second identification format. In particular, first pinmap document 114 maps the natural language pin references of second test code 54 to the pin references of test system software 60 written in the second identification format. See, for example, exemplary portion 90 of first pinmap document 114 illustrated in FIG. 4A. Referring to line 91, the "P3" reference utilized by second test code 54 is mapped to the pin reference "TERM9_SCOPE CHAN(3)" utilized by test system software 60. In the illustrated embodiment, the pin references utilized by test system software 60 identify the corresponding channels of adaptor 38 that are in communication with the pins of circuit card assembly 20. Based on the pin configuration input at block 100, first pinmap document 114 maps the locations of the input pins, the output pins, the power pins, etc. of circuit card assembly 20 to the pin references of test system software 60. In one embodiment, first pinmap document 114 is a program header file of second test code 54 that is loaded into test system 30. As represented by block 108, second test code 54 is interfaced with software 60 using first pinmap document 114.

User interface 32 of test system 30 identifies and displays the pins of circuit card assembly 20 using a third identification format or nomenclature. At block 110 of FIG. 4, a second pinmap document 116 is generated that associates each channel of test system 30 with a pin reference written in the third identification format utilized by user interface 32. As described above, second pinmap document 116 is utilized by computer 34 to accurately report and display the status of each pin on circuit card assembly 20 to user interface 32, as represented by block 112 of FIG. 4. Second pinmap document 116 may also define the data buses associated with the channels of test system 30. In the illustrated embodiment, second pinmap document 116 is a comma separated value (.csv) file that contains all the pin names and bus definitions for second test code 54 that runs on test system 30. Referring to exemplary portion 92 of second pinmap document 116 illustrated in FIG. 4B, Channel 68 of test system 30 is mapped to pin reference "C64_P198" and bus "XFRMSN2". Upon loading second pinmap document 116 into test system 30, pin reference "C64_P198", rather than "Channel 68", is displayed by user interface 32 when reporting the status of pin 198 of circuit card assembly 20 to a user.

Referring to FIGS. 5-16, an exemplary method of translating a program source code from one language to another is provided. The translation method of FIGS. 5-16 is illustratively employed by translator 52 of FIG. 2. In the illustrated embodiment of FIGS. 5-16, second test code 54, written in C language, is generated based on a translation of first test code 50, written in Raytheon Test Language ("RTL"). In addition, documentation 56 of FIG. 2 is generated according to the translation method illustrated in FIGS. 5-16.

Figure 5:
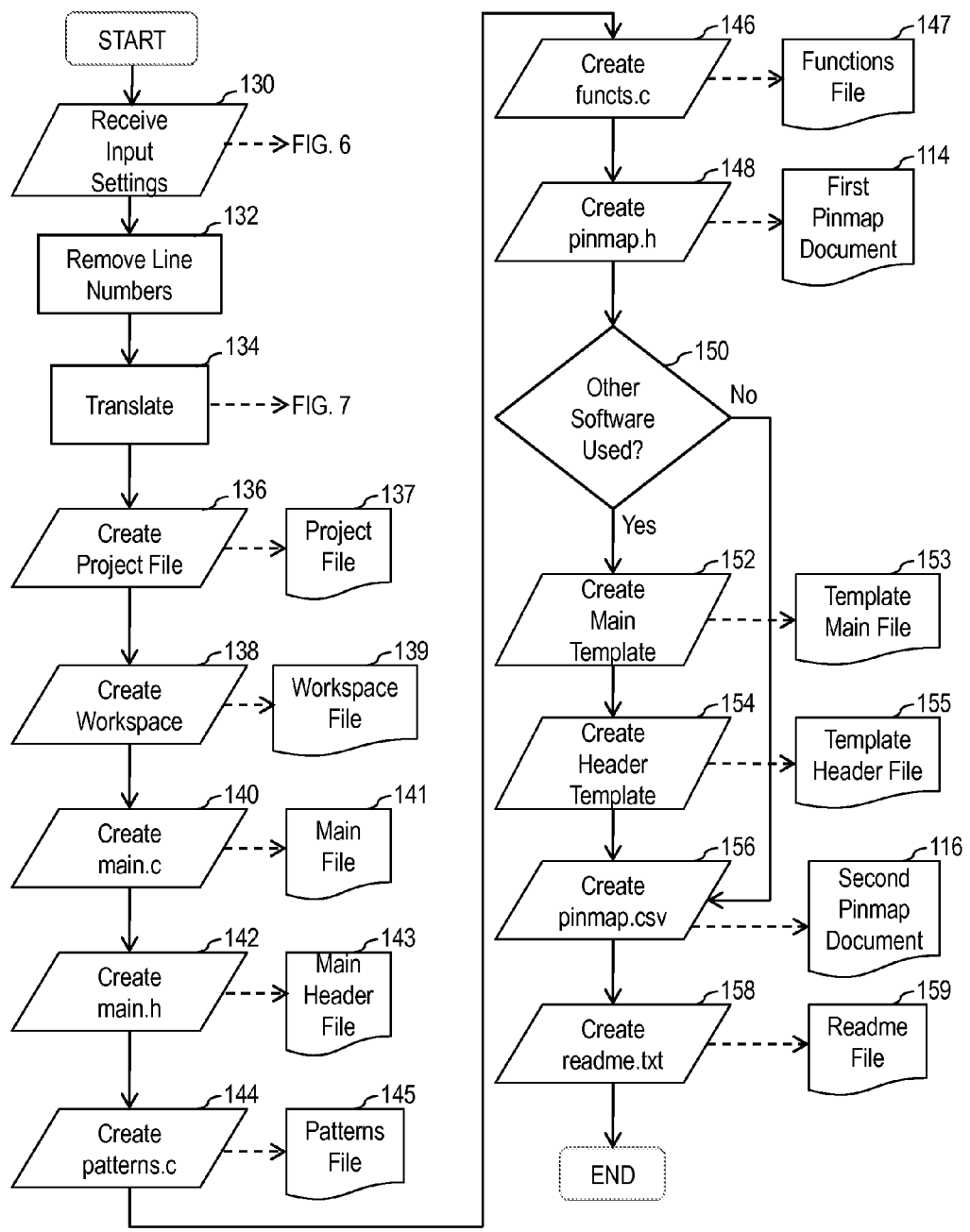
FIG. 5 is a flowchart illustrating an exemplary test code generation process according to one embodiment.

As represented by block 130 of FIG. 5, translator 52 first receives input settings and parameters from a user to aid in the translation. FIG. 6 provides a detailed flowchart illustrating an exemplary process of receiving input settings. In blocks 180-182 of FIG. 6, the user enters a project name and indicates the storage directory for where the program files of test code 54 are to be created. At block 184, the user retrieves the source code file that is to be translated by translator 52. In particular, the user selects a first test code 50 that corresponds to the circuit card assembly 20 of interest from a memory source (e.g. computer memory or a removable memory device) and loads the selected first test code 50 into translator 52. In blocks 186-206, the pin configuration of the selected circuit card assembly 20 is entered into translator 52. Each pin of circuit card assembly 20 has a corresponding pin number that serves to identify the location of the pins. At block 186, the total number of pins on circuit card assembly 20 is entered into translator 52. At block 188, a clock pin of circuit card assembly 20 is identified and the corresponding pin number is entered into translator 52. At block 190, if circuit card assembly 20 includes tri-state pins, these tri-state pins are identified and the corresponding pin numbers are entered into translator 52. A tri-state pin is an output pin that may have a high output, a low output, or an output somewhere in between high and low. At block 192, one or more disabled pins of circuit card assembly 20 are identified and the corresponding pin numbers are entered into translator 52.

In one embodiment, 120-pin circuit card assemblies 20 may have varying power and ground pin locations, while circuit card assemblies with 201 pins may have standard power and ground pin locations. At block 194, if circuit card assembly 20 does not have 120 pins (i.e., if circuit card assembly 20 has 201 pins), translator 52 automatically identifies and enters the standard power and ground pins of circuit card assembly 20, as represented by block 198. If circuit card assembly 20 has 120 pins, the location of the power and ground pins are identified, as represented by block 196. If circuit card assembly 20 has special power and ground pins that are not in the standard locations, the location of the power and ground pins are entered into translator 52, as illustrated by blocks 200 and 202. Certain circuit card assemblies 20 may be inserted into adaptors 38 of test system 30 in an inverted orientation, causing the pins of circuit card assembly 20 to appear to test system 30 as inverted. If circuit card assembly 20 is inserted into test system 30 in an inverted orientation, the pins of circuit card assembly 20 are set in translator 52 as inverted, as represented by blocks 204 and 206.

In the illustrated embodiment, a user manually enters all information and input parameters at block 130 of FIG. 5, although translator 52 may automatically detect certain pin configurations. In addition, other input settings may be entered at block 130 of FIG. 5. For example, the user may configure translator 52 to generate all program files associated with test code 54 or to generate only certain individual program files. The input settings may be entered into translator 52 in any suitable order. After all input settings have been entered at block 130, the user may initiate the translation process, and translator 52 automatically proceeds with blocks 132-158 of FIG. 5.

At block 132 of FIG. 5, all line numbers contained in first test code 50 are removed by translator 52. Line numbers are identified and deleted from the text in first test code 50 to eliminate errors in the code translation. At block 134, translator 52 performs the translation of the first test code 50 to the second test code 54, as described herein with reference to FIGS. 7-16.

Figure 7:
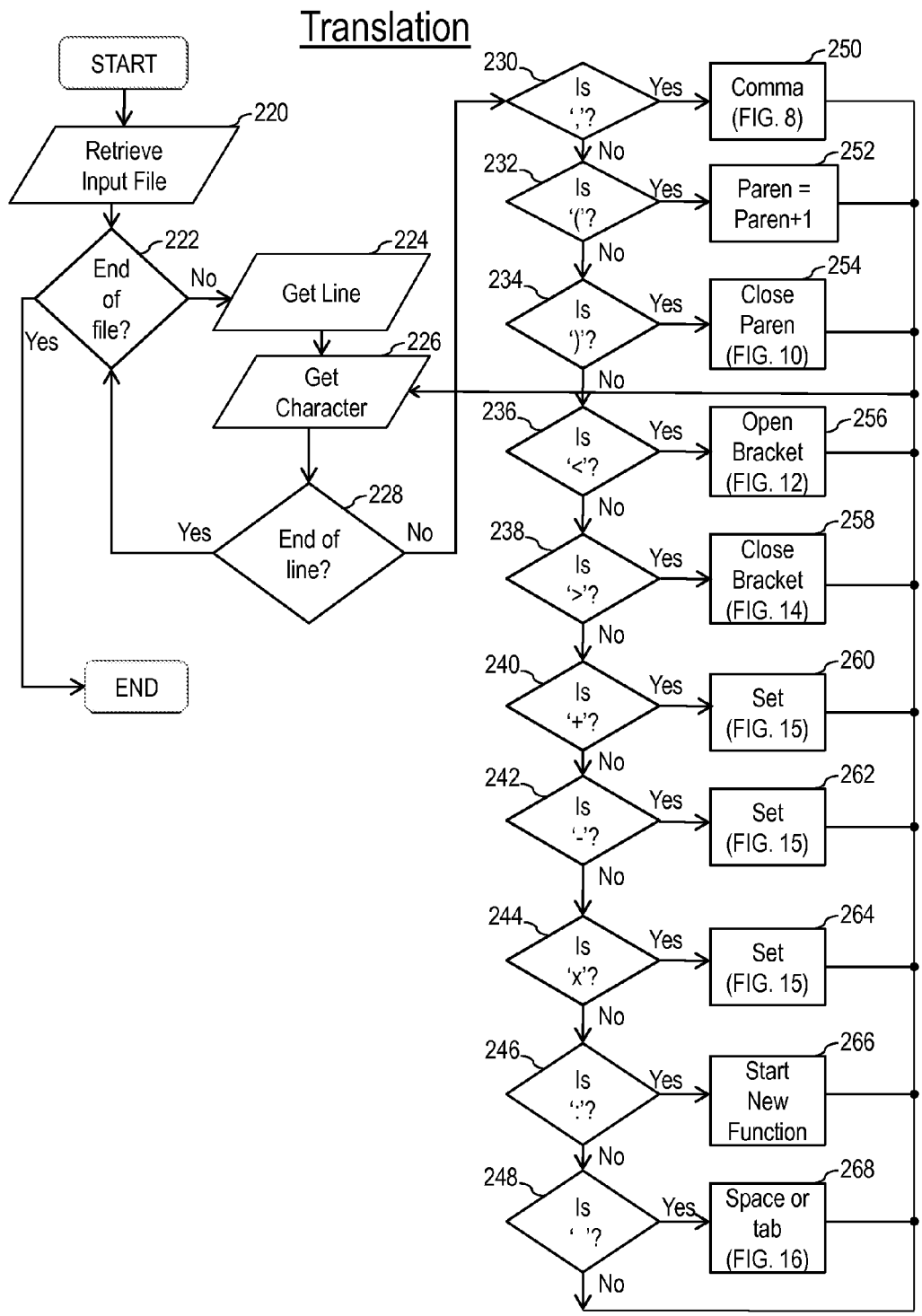
FIG. 7 is a flowchart illustrating an exemplary software translation method in the test code generation process of FIG. 5.

Referring to FIG. 7, translator 52 first retrieves the first test code 50 that was selected at block 184 of FIG. 6. As represented by blocks 222, 224, 226, and 228, translator 52 contains an algorithm that steps through each character of each line of code in first test code 50 in search of special characters. Translator 52 includes a character pointer that is used to move through each character of first test code 50. When translator 52 reaches the end of a line of code, translator 52 immediately moves to the next line of code. When translator 52 has reached the end of first test code 50, the translation is complete and translator 52 returns to block 136 of FIG. 5, as represented by block 222 of FIG. 7.

As illustrated in blocks 230-248, translator 52 searches for special characters that trigger additional algorithms used for the translation. In an illustrated embodiment, the special characters identified by translator 52 are as follows: ",", (comma), "(" (left parenthesis), ")" (right parenthesis), "<" (open bracket), ">" (close bracket), "+" (plus sign), "−" (minus sign), the letter "X", ":" (colon), and " " (space or tab). When one of these characters is found by translator 52, certain translation sequences and functions are performed on the character strings that are isolated by these special characters, as described herein.

Several different status flags may be set throughout the translation process to control the outcome of various operations. For example, a "function" flag indicates that the translation algorithm is in the middle of a function call. An "other software" flag indicates that additional software (e.g. Fortran) not translatable by translator 52 has been detected and template files must be created for this software, as described herein. A "run pattern" (rp) flag stops the RP( ) function that is to be printed after a function is complete. The RP( ) function instructs test system 30 to set updated pins without testing the outputs. The RP( ) function allows many testing steps to be completed prior to verifying the outputs of circuit card assembly 20 with the function "TPV", or test pattern verify, which is described herein. A "high speed" flag is used to flag certain functions, and a "test" flag indicates that a test routine is currently active.

Figure 8:
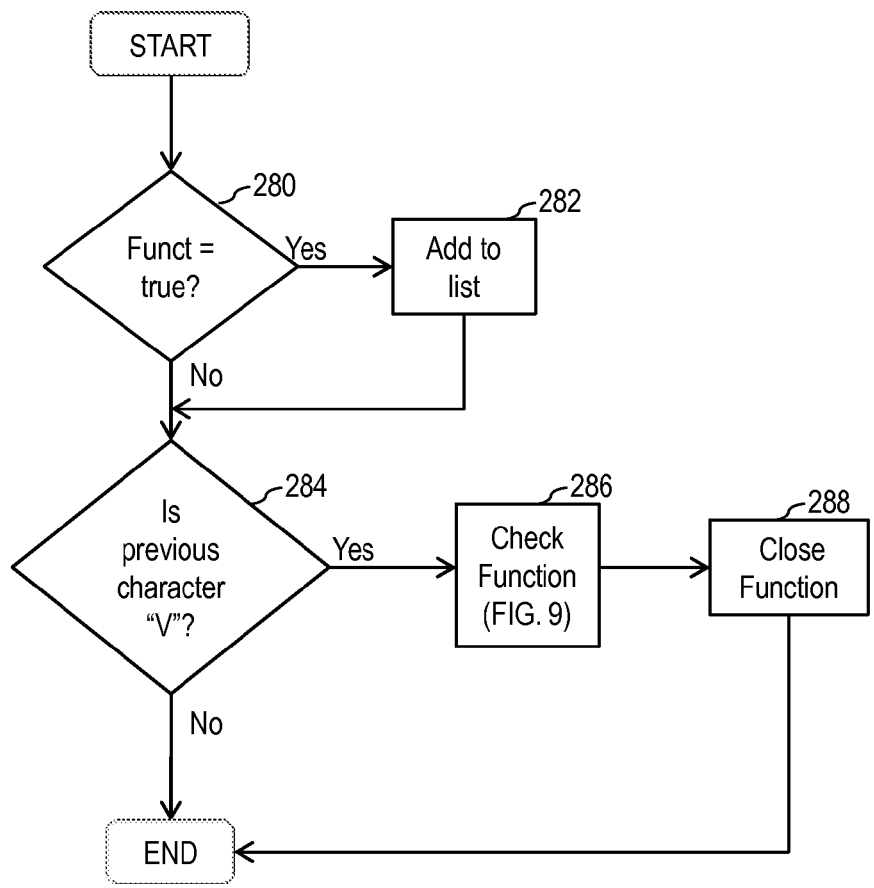
FIG. 8 is a flowchart illustrating a comma identification routine of the software translation method of FIG. 7.

When translator 52 identifies a comma ",", the "comma identification" routine illustrated in FIG. 8 is run by translator 52, as represented by blocks 230 and 250 of FIG. 7. Commas may be used in first test code 50 to separate pin names or to separate statements of code. When used to separate pin names, the commas are located in the argument portion of a function statement. At block 280 of FIG. 8, translator 52 first determines if the "function" flag is currently set. The "function" flag indicates that the translation algorithm is in the middle of a function call, i.e., that the identified comma is contained within the argument portion of a function statement. The "function" flag may be set by other sequences throughout the translation process, as described herein. If the "function" flag is set at block 280, all characters preceding the identified comma but following the last identified special character are stored in a list for later use during the translation process, as represented by block 282. For example, in the following exemplary line (1) of first test code 50, the function HI has been called and inside the brackets is a list of pins separated by commas.

$$HI<P1,P2,P3> \quad (1)$$

As the translation algorithm steps through each character in line (1), the pin names "P1", "P2", and "P3" are separately added to the list, allowing translator 52 to generate the corresponding line of second test code 54 in the proper format. After adding the pin names to the list at block 282, the "comma identification" routine proceeds to block 284. Alternatively, the "comma identification" routine may end and return to the translation sequence of FIG. 7 following block 282.

At block 284, translator 52 searches for the character "V" immediately preceding the comma to identify the function "TPV", or test pattern verify, contained in first test code 50. The TPV function instructs the test system to verify that the proper outputs are detected at the output pins of circuit card assembly 20 following the execution of a test pattern. If the previous character is a "V" at block 284, translator 52 initiates the "check function" routine (block 286) illustrated in FIG. 9, as described herein. Upon completion of the "check function" routine, translator 52 returns to block 288 of FIG. 8 to close the function. In particular, the "check function" routine of block 286 starts a function by translating the identified function in first test code 50. At block 288, the contents of the identified function (e.g., the list of pin names created in blocks 280 and 282) are added to the translated function, and the translated function is closed (e.g. a close parenthesis ')' is added to the translated function). For example, using exemplary line (1) of first test code 50 above, translator 52 creates "HI(" at block 286 and "P1,P2,P3)" at block 288, resulting in a complete function "HI(P1,P2,P3)" for second test code 54. If the previous character is not a "V" at block 284, the translation algorithm immediately returns to the translation sequence of FIG. 7 to analyze the next character in first test code 50.

Figure 9:
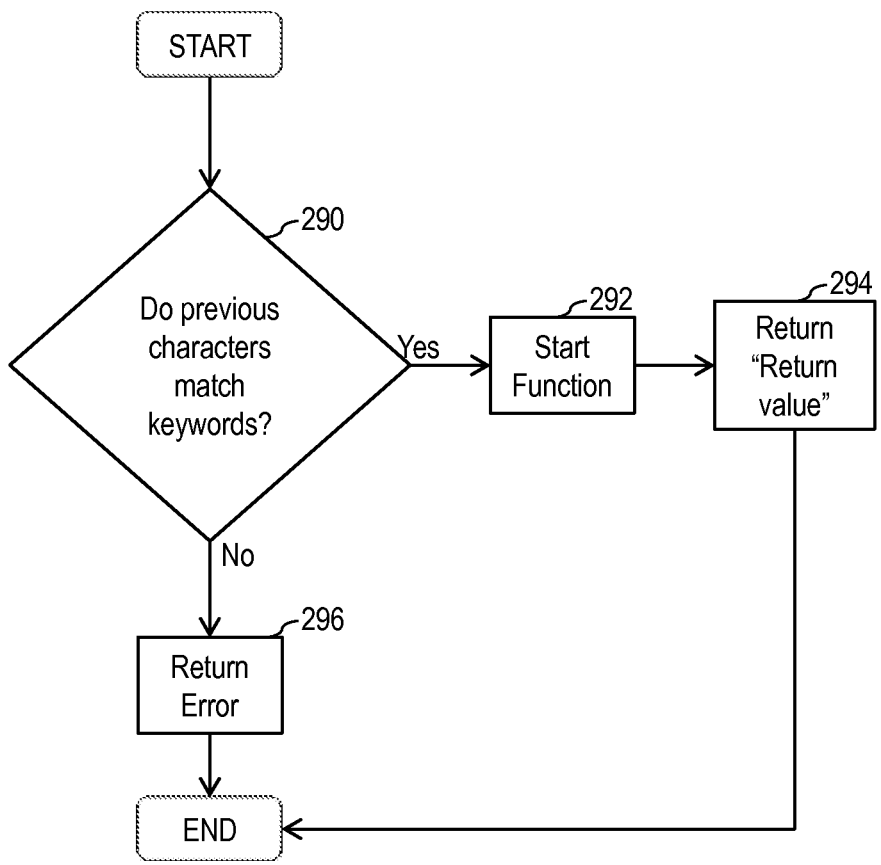
FIG. 9 is a flowchart illustrating a check function routine of the software translation method of FIG. 7.

In the "check function" routine of FIG. 9, translator 52 searches for the functions defined in first test code 50 and translates them into functions to be written into second test code 54. At block 290, if the group of characters between the previous special character and the current special character identified by translator 52 matches one of the functions of first test code 50, which are provided under "Keyword" in Table 1 below, translator 52 translates the function at block 292. In addition, translator 52 returns the corresponding return value provided in Table 1 at block 294. Otherwise, the translation algorithm returns an error at block 296 indicating that a function was not found in the "check function" routine.

TABLE 1

| Function Names and Return Values | |
|---|---|
| Keyword: | Return: |
| TITLE | Complete |
| PROG | Complete |
| END | Done |
| DISP | Complete |
| PAUSE | Complete |
| STOP | Complete |
| EQU | Complete |
| INPUT | Complete |
| OUTPUT | Complete |
| TEST | Test |
| DONE | Done |
| RTN | Continue |
| CALL | Continue |
| LINK | Continue |
| GOTO | Continue |
| DO | Loop |
| IF | Loop |
| HI | Function |
| LO | Function |
| INV | Function |
| XX | Function |
| SEQ | Function |
| CNT | Function |
| CLK | Continue |
| TOG | Function |
| TPV | TPV |
| DELAY | Continue |
| DASH | Continue |
| SYNC | Continue |
| HSDLY | Continue |
| HSA | Continue |
| HSB | Continue |
| HSL | Continue |
| HSR | Continue |

Figure 13:
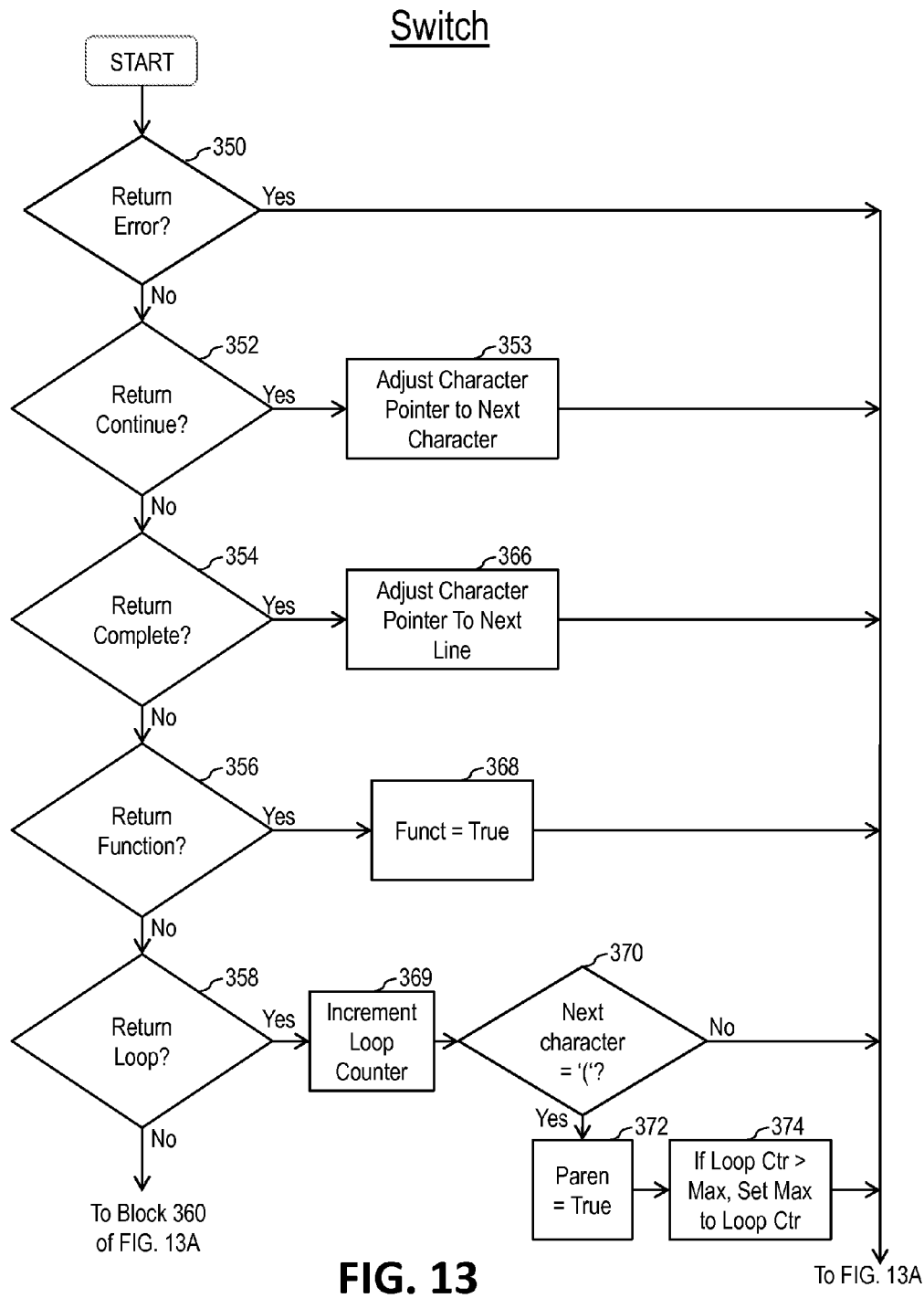
FIGS. 13 and 13A are flowcharts illustrating a switch routine of the software translation method of FIG. 7.

The return values in Table 1 direct translator 52 on how to proceed with the translation. The return values are obtained whenever translator 52 runs the "check function" routine of FIG. 9. Translator 52 may handle the return values by running the "switch" routine illustrated in FIGS. 13 and 13A. The "switch" routine directs the translation algorithm based on the return value obtained from the "check function" routine of FIG. 9. Referring to FIG. 13, when the return value is Error (block 350), a function was not found in the "check function" routine and translator 52 is directed to proceed with the translation sequence of FIG. 7. The Continue return value indicates that the handling of the function is complete and directs translator 52 to proceed to the next character in first test code 50, as represented by blocks 352 and 353. In first test code 50, two or more functions are sometimes contained in the same line of code. These functions may return Continue so that translator 52 continues to check the same line of code for additional special characters before proceeding to the next line of first test code 50. The Complete return value directs translator 52 to proceed to the next line of first test code 50 to continue the translation, as represented by blocks 354 and 366. Functions that stand alone on a single line of first test code 50 may return Complete to direct translator 52 to continue searching for special characters on the next line of first test code 50.

Figure 14:
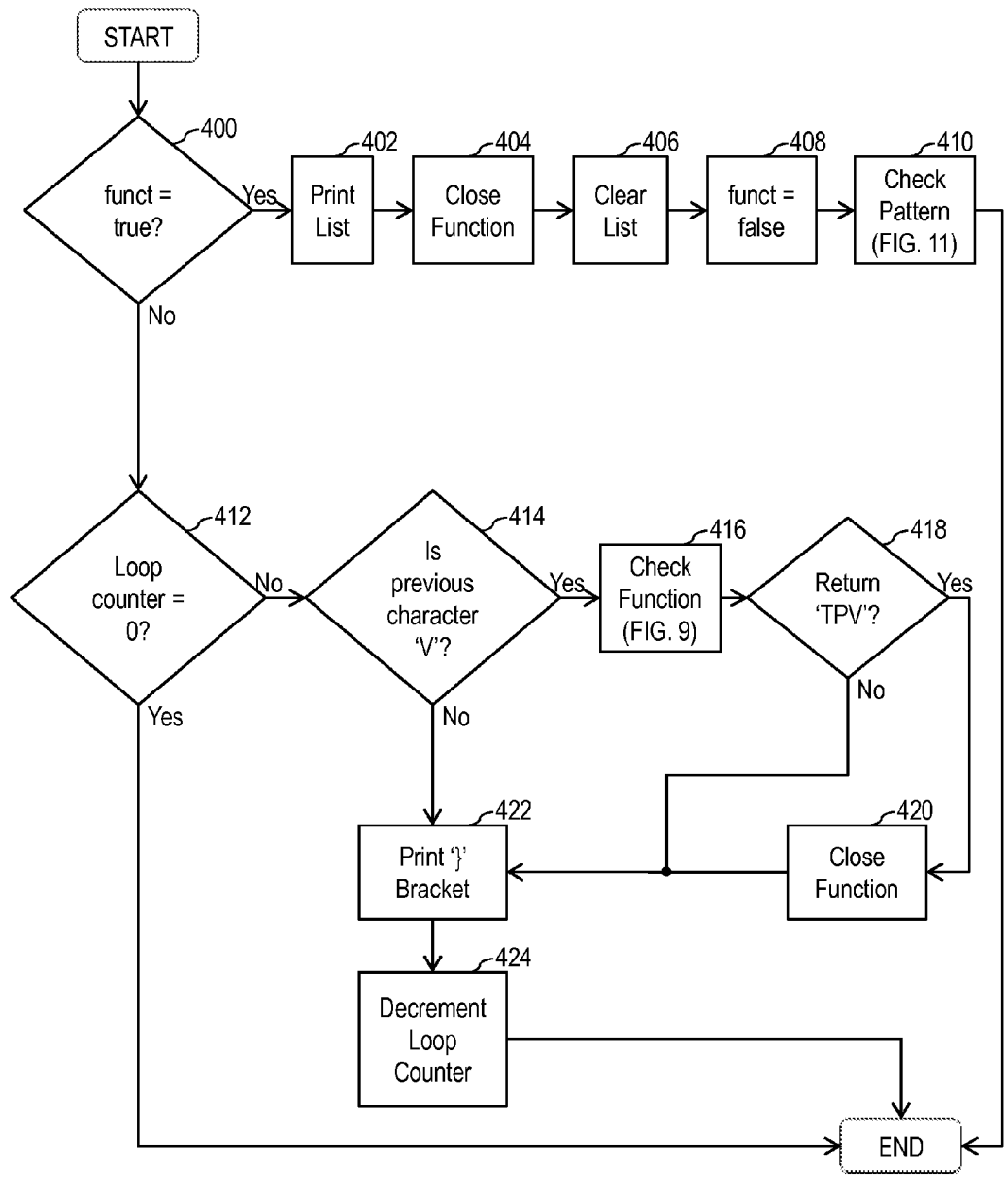
FIG. 14 is a flowchart illustrating a close bracket routine of the software translation method of FIG. 7.

The Function return value sets the "function" flag, as represented by blocks 356 and 368. The functions of first test code 50 that return Function each include a list of pins that are usually handled by translator 52 and translated properly into the language of second test code 54. The "close bracket" routine writes this list of pins into second test code 54, as illustrated in FIG. 14 and described herein.

Some functions of first test code 50 contain other embedded functions. Referring to block 358 of FIG. 13, the return value of Loop is returned by these functions. As represented by block 369, the Loop return value increments a loop counter that tracks the number of loop functions that have been called and that indents the next line of code in second test code 54 according to the number of loop functions that have been called. In addition, translator 52 sets the parenthesis flag to "true" if the next character is an open parenthesis '(', as represented by blocks 370 and 372. Blocks 370 and 372 capture the loops of first test code 50 that are contained within parentheses. At block 374, the loop counter stores the maximum value it reaches in a memory. The maximum value of the loop counter is used by translator 52 to define variables needed for the loops written to second test code 54.

Figure 13A:
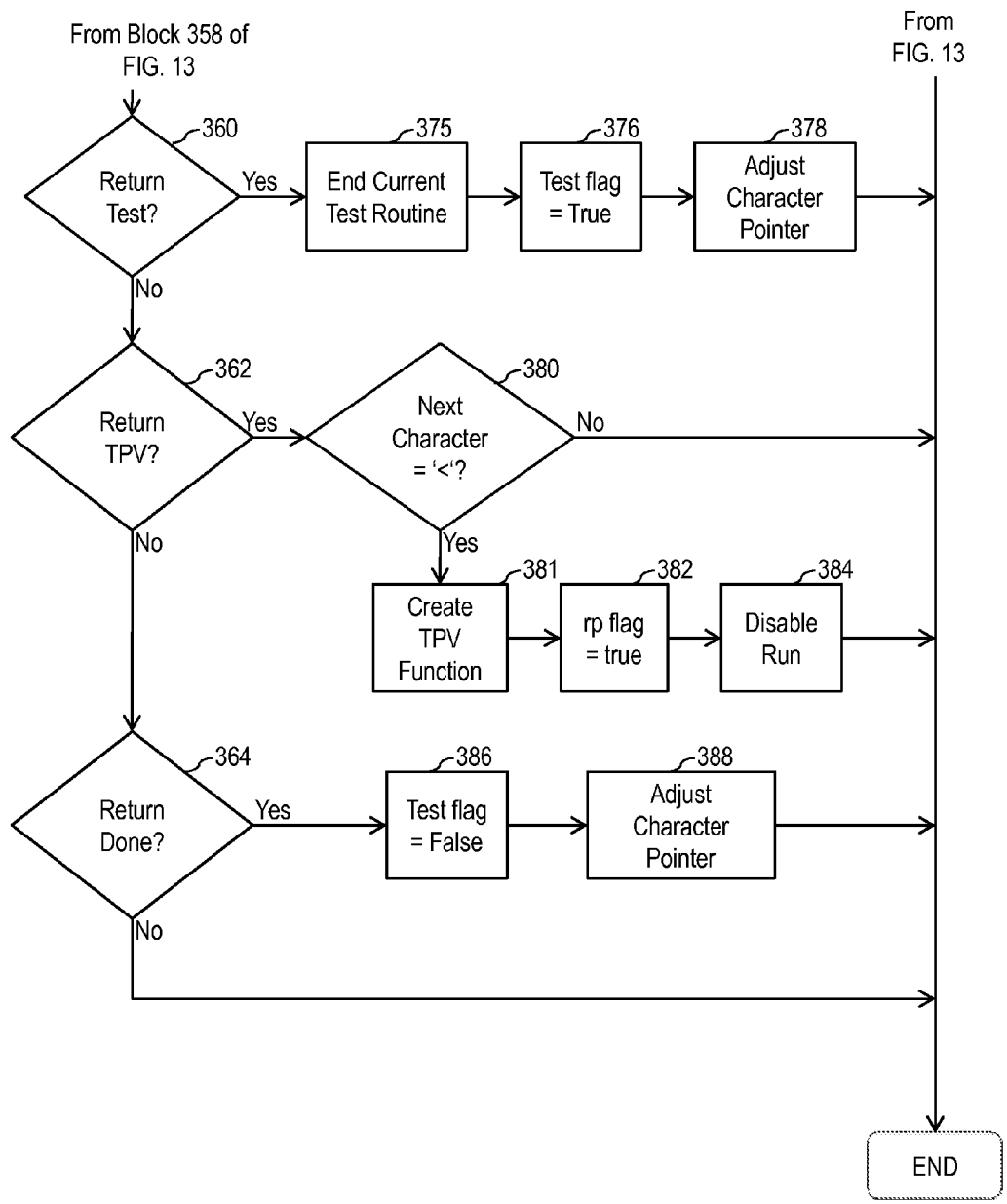

The return values of Test and Done act together in the translation algorithm. Translator 52 creates a separate test routine in second test code 54 for each circuit card test routine that is contained in first test code 50. See, for example, circuit card test routine 59 of first test code 50 in FIG. 2A and test routine 63 of second test code 54 illustrated in FIG. 2B. Each test routine in second test code 54 may be called independently by other code portions of second test code 54, allowing test system 30 to run each test routine independently without having to run all of the test routines. Referring to FIG. 13A, the return value of Test at block 360 directs translator 52 to start a new test routine by setting the "test" flag to true, as represented by block 376. If the translation algorithm is currently in the middle of a test routine (i.e. the "test" flag already is set to true), translator 52 ends that test routine first before starting a new test routine, as represented by block 375. In addition, the character pointer is adjusted to the next character of first test code 50, as represented by block 378. The return value of Done directs translator 52 to end the current test routine by setting the "test" flag to false, as represented by block 386. If a new test routine begins in first test code 50 before a function is called that returns Done to end the previous test routine, translator 52 records a note in a build log to alert the user. At block 388, the character pointer is adjusted to the next character of first test code 50.

At blocks 362 and 380, the return value of TPV directs translator 52 to determine if the next character is an open bracket. In some instances, a TPV function in first test code 50 is immediately followed by an argument in brackets (e.g. TPV<P3,P4>). In other instances, the TPV function in first test code 50 stands alone, and translator 52 ends the "switch" routine following block 380. If a left bracket '<' is identified at block 380, translator 52 creates a TPV (test pattern verify)

function in second test code 54 which is configured to verify the current test pattern at block 381. When executed, the TPV function created in second test code 54 directs test system 30 to test the input and output pins according to the current test pattern and to verify that the proper states at the output pins are detected. The TPV return value also sets the run pattern "rp" flag at block 382. As described above, the "rp" flag is used to stop the RP( ) function that is to be printed after a function is complete. At block 384, translator 52 disables the test pattern.

The return values of Table 1 are occasionally not handled by translator 52; i.e., the "switch" routine is not run after every "check function" routine in the translation algorithm. In the illustrated embodiment, the TPV function is the only function in first test code 50 that ends with the character 'V'. Whenever translator 52 is searching for the 'V' character and then runs the "check function" routine, translator 52 will not handle the return as it assumes that a TPV function will be found. For example, in the "comma identification" routine of FIG. 8, translator 52 looks for a specific function preceding the comma in the "check function" routine but does not handle the return value of that function by calling the "switch" routine. However, in the "open bracket" routine of FIG. 12 described herein, the return values are handled in the "switch" routine immediately after the completion of the "check function" routine.

Figure 10:
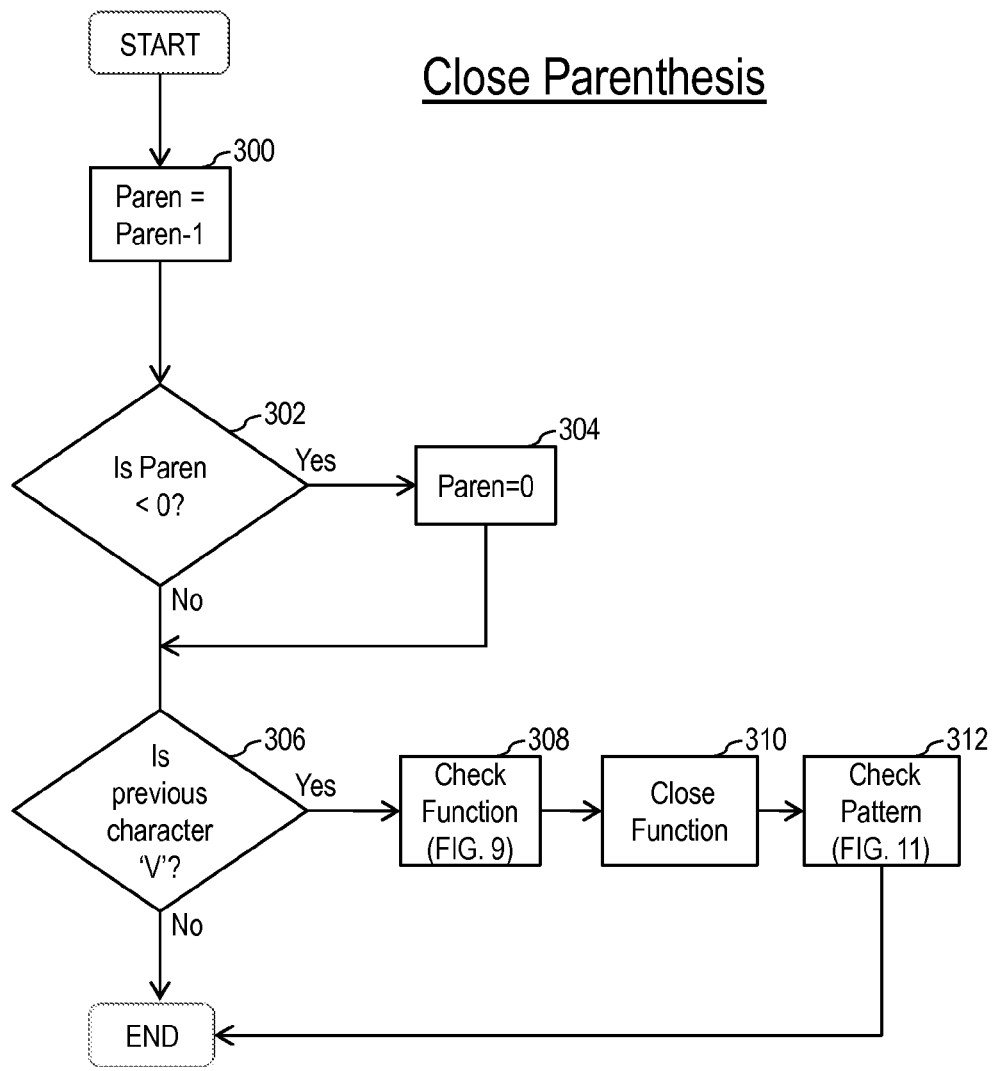
FIG. 10 is a flowchart illustrating a close parenthesis routine of the software translation method of FIG. 7.

When translator 52 identifies a left parenthesis "(" at block 232 of FIG. 7, a parenthesis counter is incremented at block 252. The parenthesis counter keeps track of all open and close parentheses to identify when to act on the contents within the parentheses. When translator 52 identifies a right parenthesis ")" at block 234, the "close parenthesis" routine illustrated in FIG. 10 is run by translator 52, as represented by block 254. At block 300 of FIG. 10, the parenthesis counter is decremented by one. If the parenthesis counter is less than zero, the parenthesis counter is reset to zero, as represented by blocks 302 and 304. In blocks 306-312, translator 52 acts on the contents contained within the previous set of parentheses. At block 306, translator 52 checks if the character preceding the special character ')' is a "V", indicating a TPV function is contained within the parentheses. If a "V" is identified, the "check function" routine is again run by translator 52 at block 308, and the function is closed at block 310. At block 312, the "check pattern" routine (see FIG. 11) is run by translator 52 before returning to the translation sequence of FIG. 7 to analyze the next character of code.

Figure 11:
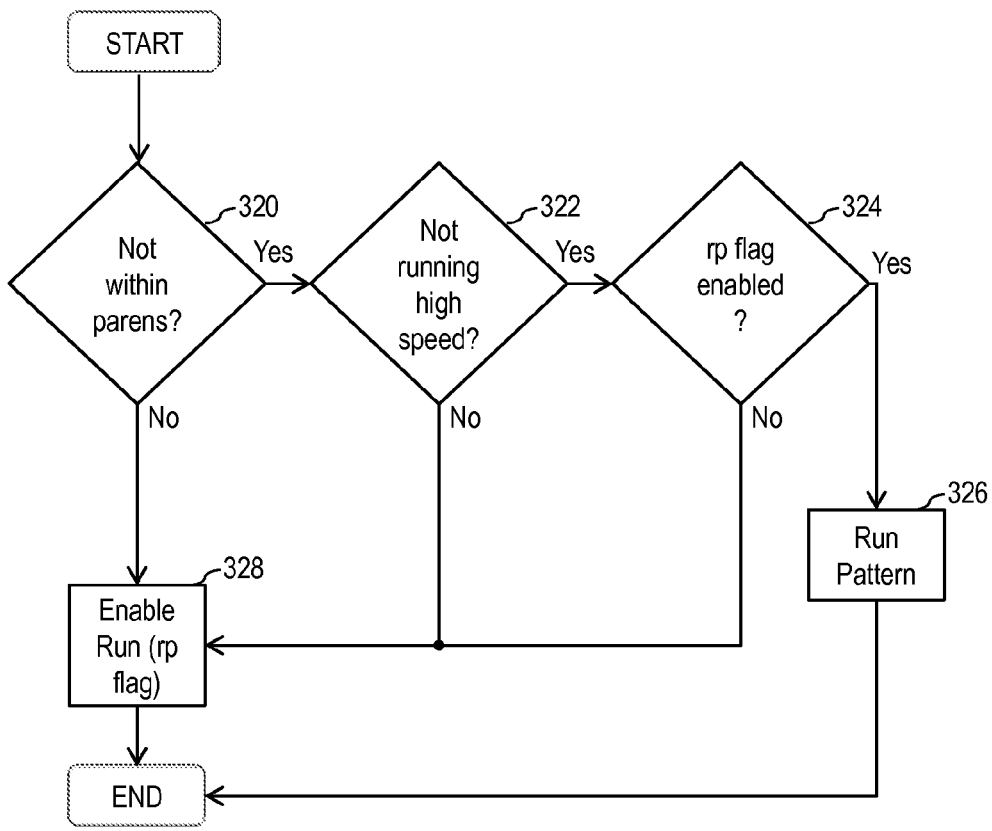
FIG. 11 is a flowchart illustrating a check pattern routine of the software translation method of FIG. 7.

Referring to FIG. 11, the "check pattern" routine places a "run pattern" function into second test code 54. In the illustrated embodiment, the run pattern function is entered into second test code 54 (written in C language) as "RP( )". When executed, the run pattern function instructs test system 30 to set the input pins according to the test pattern. However, the run pattern function does not instruct test system 30 to test the output pins for correctness (i.e., for the proper output signal) based on the set input pins. The run pattern function, when executed by test system 30, allows multiple signal combinations to be introduced at the inputs and allows these various signals to propagate through the circuitry of circuit card assembly 20 before the output pins are tested by test system 30.

The "check pattern" routine first verifies three conditions: 1) the translation algorithm is currently not within any parentheses according to the parenthesis counter (block 320); 2) the current circuit card test is not a high speed test (block 322); and 3) the run pattern "rp" flag is enabled (block 324). Test system 30 is configured to run both normal speed tests and high speed tests on circuit card assembly 20. During a high speed test, the run pattern RP( ) functions are not used. If all three conditions in blocks 320-324 are true, translator 52 places a run pattern RP( ) function in second test code 54, as represented by block 326. If any of the three conditions in blocks 320-324 are not true, translator 52 will enable the run pattern "rp" flag and will not place a run pattern RP( ) function in second test code 54.

Figure 12:
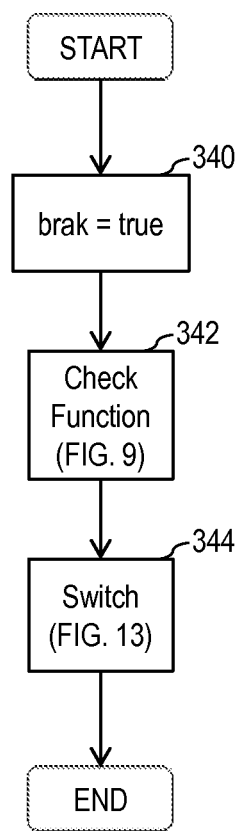
FIG. 12 is a flowchart illustrating an open bracket routine of the software translation method of FIG. 7.

When translator 52 identifies an open bracket "<" at block 236 of FIG. 7, the "open bracket" routine illustrated in FIG. 12 is performed by translator 52, as represented by block 256. At block 340, the "bracket" flag is set to indicate to translator 52 that the translation algorithm is currently in the midst of a bracket argument. At block 342, the translation algorithm jumps to the "check function" routine of FIG. 9 to identify the function preceding the open bracket and to return the corresponding return value. At block 344, translator 52 runs the "switch" routine to handle the return value of the "check function" routine, as described above with reference to FIGS. 13 and 13A.

An open bracket is often followed closely by a close bracket in first test code 50. When translator 52 identifies a close bracket ">" at block 238 of FIG. 7, the "close bracket" routine illustrated in FIG. 14 is performed by translator 52, as represented by block 258. The "close bracket" routine actually writes code to second test code 54. At block 400 of FIG. 14, translator 52 first checks the function flag. If the function flag is set, the values (i.e. pin names) from the list compiled in the "comma" routine of FIG. 8 are written to second test code 54, as represented by block 402. Translator 52 closes the function (block 404), clears the list of values (block 406), and clears the function flag (block 408). At block 410, translator 52 jumps to the "check pattern" routine of FIG. 11 to place the run pattern RP( ) function in second test code 54 before returning to the translation sequence of FIG. 7.

At block 412, if the loop counter is zero, translator 52 ends the "close bracket" routine. At blocks 412, 414, and 416, if the loop counter is not zero and the previous character is a "V" (indicating a TPV function), translator 52 runs the "check function" routine of FIG. 9 to check the previous characters before the last open bracket for a function. At block 418, if the "check function" sequence returns "TPV", the function loop is closed at block 420 and the return value is not handled by translator 52 (i.e. a "switch" routine is not run). At block 422, the bracket "}" is written to second test code 54 to indicate the end of the loop. Finally, at block 424, the algorithm decrements the loop counter.

Figure 15:
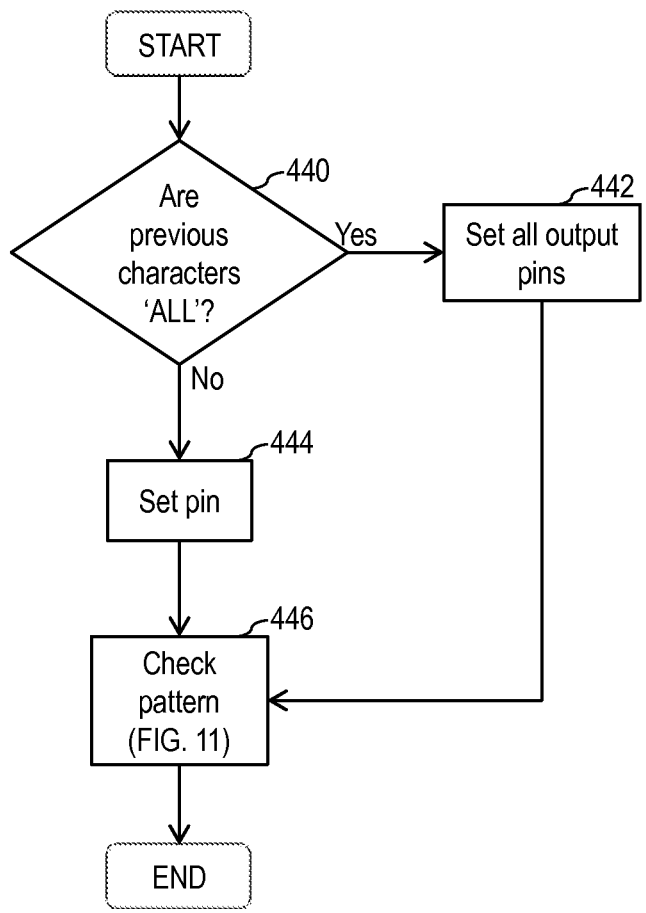
FIG. 15 is a flowchart illustrating a set routine of the software translation method of FIG. 7.

When translator 52 identifies a plus sign "+", a minus sign "−", or the letter "X", the "set" routine illustrated in FIG. 15 is run by translator 52, as represented by blocks 240, 242, 244, 260, 262 and 264 of FIG. 7. In first test code 50, a plus sign or a minus sign typically follows each pin value. The plus and minus signs are used to set the corresponding pin of circuit card assembly 20 to a high or low state, respectively. See, for example, the following exemplary line (2) of first test code 50.

$$(128+,190+,193-,194-,197-,40-)\text{TPV} \qquad (2)$$

In line (2), pins 128 and 190 are set high and pins 193, 194, 197, and 40 are set low. In first test code 50, the 'X' value indicates that the corresponding pin(s) is a tri-state pin and can have a value ranging from low to high without causing an error in the test.

Referring to block 440 of FIG. 15, translator 52 checks the previous characters of first test code 50 for the word "ALL". If the word "ALL" is identified, translator 52 writes corresponding code in second test code 54 configured to set all the pins of circuit card assembly 20 to the appropriate state (as determined by the '+', '−', or 'X' character), as represented by block 442. If the word "ALL" is not identified, translator 52 writes corresponding code in second test code 54 configured to set only certain pins (specified in first test code 50) to the appropriate state in second test code 54, as represented by block 444. At block 446, translator 52 runs the "check pattern" routine of FIG. 11 before continuing with the translation.

When translator 52 identifies a colon ":" at block 246 of FIG. 7, translator 52 starts a new function in second test code 54, as represented by block 266. Translator 52 also increments the test number associated with the test routine. In one embodiment, translator 52 may print comments above the new test routine. If the "test" flag is set at block 246, translator 52 closes all loops and the current test routine before starting a new test routine.

Figure 16:
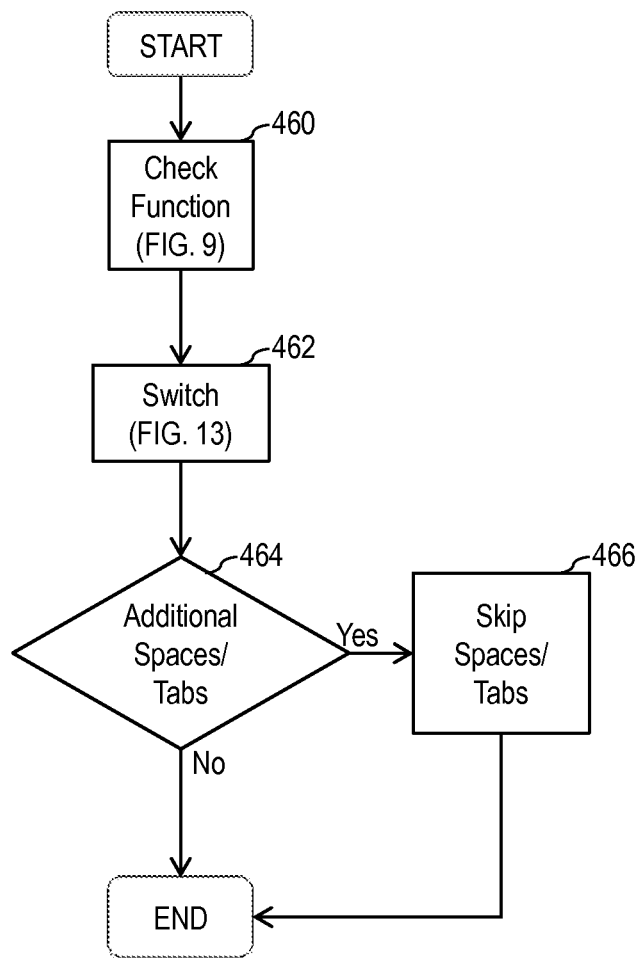
FIG. 16 is a flowchart illustrating a space or tab routine of the software translation method of FIG. 7.

When translator 52 identifies a space or tab " ", the "space or tab" routine illustrated in FIG. 16 is run by translator 52, as represented by blocks 248 and 268 of FIG. 7. At block 460 of FIG. 16, translator 52 runs the "check function" routine of FIG. 9. Translator 52 runs the "switch" routine of FIG. 13 at block 462 to handle the return value from the "check function" routine. At block 464, translator 52 determines if the next characters of first test code 50 include more spaces or tabs. Translator 52 skips any multiple spaces or tabs that occur in a row in first test code 50, as represented by block 466.

Upon completion of the translation in block 134 of FIG. 5, translator 52 generates all program files associated with second test code 54 as well as documentation utilized by test system 30. At blocks 136 and 138, translator 52 generates a project file 137 and a workspace file 139. Project file 137 and workspace file 139 may be run at computer 34 of test system 30 to open, edit, and/or compile the program files associated with second test code 54. In one embodiment, project file 137 and workspace file 139 are Labview files configured to run in a Labview program stored at computer 34. At blocks 140 and 142, a main file 141 and a main header file 143 are generated by translator 52. Main file 141 contains all of the setup and user interface code required to run a test on test system 30. Main header file 143 contains all the declarations. In particular, all functions and global variables are defined in main header file 143. In the illustrated embodiment, main file 141 and main header file 143 are C files having a .c extension and a .h extension, respectively.

At block 144, a patterns file 145 is created by translator 52. Patterns file 145 contains the main translation from first test code 50. In particular, patterns file 145 contains the actual test code and test routines run by test system 30 on circuit card assembly 20. For example, FIG. 2B contains an exemplary portion (e.g. test routine 63) of patterns file 145. At block 146, a functions file 147 is created by translator 52. Functions file 147 contains the hybrid functions that are called by patterns file 145, as described above with reference to FIG. 3. In the illustrated embodiment, patterns file 145 and functions file 147 are C files having .c extensions.

At block 148, first pinmap document 114, described above with reference to FIG. 4, is created by translator 52. In the illustrated embodiment, first pinmap document 114 is a header file in C language having a .h extension. First pinmap document 114 contains the definitions of the pinmap including which pins of circuit card assembly 20 are power or ground pins and which pins of circuit card assembly 20 are normal input and output pins.

At block 150, translator 52 determines if an additional software test code was utilized by the legacy test system. If yes, translator 52 creates template files 153 and 155 at blocks 152 and 154, respectively. As discussed above with reference to FIG. 2, template files 153 and 155 are software code templates configured to receive program code manually input by a user or automatically input by another program or system following the translation by translator 52. For example, if first test code 50 references software functions written in Fortran language, template files 153 and 155 define these Fortran functions. In one embodiment, template file 153 is a main file with a .c extension that contains the translated Fortran functions called by first test code 50. In one embodiment, template file 155 is a header file with a .h extension that contains the translated Fortran function prototypes needed by the compiler of second test code 54. If translator 52 is not configured to translate Fortran language code, the user provides the translations of the Fortran software code to template files 153 and 155.

At block 156, translator 52 generates second pinmap document 116, as described above with reference to FIG. 4. In the illustrated embodiment, second pinmap document 116 is a spreadsheet document, such as a comma separated value (.csv) file for example, that contains all the pin names and bus definitions for second test code 54 that runs on test system 30. This file is imported into computer 34 to interface with software 60 so that software 60 displays the proper pin names of circuit card assembly 20 to user interface 32.

At block 158, translator 52 generates a readme file 159 that contains a description of the files created by translator 52. In particular, readme file 159 may be a text file containing various instructions, notes, and comments regarding the program files created by translator 52.

In one embodiment, once second test code 54 has been created by translator 52, the user may open and compile second test code 54 at computer 34 of test system 30. In another embodiment, computer 34 generates an output file that contains the compiled test program. The user runs the compiled test program to perform the test on circuit card assembly 20 at test system 30.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A software translation method comprising the steps of:
receiving a first software code containing a first function command and data associated with the first function command, the first function command being configured to produce a first result;
associating at least one second function command in a second software code with the first function command; and
generating a third software code based on the first software code, the generating step including:
creating a hybrid function command based on the first function command, the hybrid function command including an interface to the at least one second function command of the second software code; and
creating a case statement configured to associate the first function command of the first software code with the hybrid function command and to provide the data associated with the first function command to the hybrid function command, the hybrid function command being configured to produce the same first result as the first function command upon execution of the hybrid function command using the data associated with the first function command of the first software code provided by the case statement;

wherein said first function command and said hybrid function command comprises a function name description and parameter list, wherein said first function command's function name description and said hybrid command's function name description are comprised of identical function name descriptions;

wherein the third software code includes a first program file containing the case statement and a second program file containing the hybrid function command.

2. The software translation method of claim 1, wherein the first software code is in a first computer language and the second software code and the third software code are in a second computer language.

3. The software translation method of claim 1, wherein the first software code is a test code utilized by a first test system for performing an operational test on a circuit card assembly and the second and third software codes are test codes utilized by a second test system for performing the operational test on the circuit card assembly, wherein the first result produced by the first function command and the hybrid function command includes at least one test operation of the operational test on the circuit card assembly.

4. The software translation method of claim 3, wherein the second software code is an instrument code file configured to interact with testing instruments of the second test system to execute the at least one test operation on the circuit card assembly.

5. The software translation method of claim 4, wherein the associating step includes identifying at least one second function command in the second software code that is configured to cause the testing instruments of the second test system to perform at least a portion of the at least one test operation on the circuit card assembly.

6. The software translation method of claim 5, wherein the data associated with the first function includes the identification of at least one pin of the circuit card assembly, the at least one test operation being performed on the at least one pin of the circuit card assembly.

7. A software translation system comprising:
a first non-transitory machine readable medium section comprising a plurality of machine readable instructions comprising first software code containing a first function command and data associated with the first function command, the first function command being configured to produce a first result;
a second non-transitory machine readable medium section comprising a plurality of machine readable instructions comprising second software code containing at least one second function command; and
a third non-transitory machine readable medium section comprising a plurality of machine readable instructions comprising translator configured to receive the first software code and to generate a fourth non-transitory machine readable medium section comprising a plurality of machine readable instructions including a third software code based on the first software code, the third software code including
a hybrid function command including an interface to the at least one second function command of the second software code and
a case statement associating the first function command of the first software code with the hybrid function command and being configured to provide the data associated with the first function command to the hybrid function command, the hybrid function command being configured to produce the same first result as the first function command upon execution of the hybrid function command using the data associated with the first function command of the first software code provided by the case statement;
wherein said first function command and said hybrid function command comprises a function name and parameter list, wherein said first function command's function name and said hybrid command's function name are comprised of identical function name descriptions;
wherein the third software code includes a first program file containing the case statement and a second program file containing the hybrid function command.

8. The software translation system of claim 7, wherein the translator is an executable computer program.

9. The software translation system of claim 7, wherein the first software code is a test code written in a first computer language utilized by a first test system for performing an operational test on a circuit card assembly and the second and third software codes are test codes written in a second computer language utilized by a second test system for performing the operational test on the circuit card assembly, wherein the first result produced by the first function command and the hybrid function command includes at least one test operation of the operational test on the circuit card assembly.

10. The software translation system of claim 9, wherein the second software code is an instrument code file configured to interact with testing instruments of the second test system to execute the at least one test operation on the circuit card assembly.

11. The software translation system of claim 10, wherein the second software code is stored in a memory of a computer of the second test system.

12. The software translation system of claim 10, wherein the at least one second function command in the second software code is configured to cause the testing instruments of the second test system to perform at least a portion of the at least one test operation on the circuit card assembly.

13. The software translation system of claim 12, wherein the data associated with the first function includes the identification of at least one pin of the circuit card assembly, the at least one test operation being performed on the at least one pin of the circuit card assembly.

* * * * *